US008615395B2

(12) United States Patent
Tomono et al.

(10) Patent No.: US 8,615,395 B2
(45) Date of Patent: Dec. 24, 2013

(54) GENERATING A DISPLAY SCREEN IN RESPONSE TO DETECTING KEYWORDS IN SPEECH

(75) Inventors: Kazuaki Tomono, Itami (JP); Kenichi Takahashi, Sennan-gun (JP); Takeshi Minami, Amagasaki (JP); Daisuke Sakiyama, Kawanishi (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 440 days.

(21) Appl. No.: 12/880,864

(22) Filed: Sep. 13, 2010

(65) Prior Publication Data
US 2011/0066435 A1 Mar. 17, 2011

(30) Foreign Application Priority Data
Sep. 15, 2009 (JP) ................................. 2009-213158

(51) Int. Cl.
*G10L 15/00* (2013.01)
(52) U.S. Cl.
USPC ............................ 704/231; 704/246; 704/251
(58) Field of Classification Search
USPC ........................... 704/231, 246, 251, 270, 275
See application file for complete search history.

(56) References Cited

U.S. PATENT DOCUMENTS

| | | | | |
|---|---|---|---|---|
| 2004/0047461 | A1* | 3/2004 | Weisman et al. | 379/202.01 |
| 2004/0076277 | A1* | 4/2004 | Kuusinen et al. | 379/202.01 |
| 2005/0207554 | A1* | 9/2005 | Ortel | 379/202.01 |
| 2006/0064298 | A1* | 3/2006 | Lee | 704/200 |
| 2007/0106724 | A1 | 5/2007 | Gorti et al. | |
| 2007/0168190 | A1 | 7/2007 | Itagaki | |
| 2009/0220065 | A1* | 9/2009 | Ahuja et al. | 379/202.01 |
| 2009/0273659 | A1* | 11/2009 | Lee et al. | 348/14.02 |
| 2009/0327263 | A1* | 12/2009 | Maghoul | 707/5 |

FOREIGN PATENT DOCUMENTS

| | | |
|---|---|---|
| JP | 9-331385 | 12/1997 |
| JP | 2000-32422 | 1/2000 |
| JP | 2000-341659 | 12/2000 |
| JP | 2005-197945 | 7/2005 |
| JP | 2005-266980 | 9/2005 |
| JP | 2008-147921 | 6/2008 |

OTHER PUBLICATIONS

First Office Action dated Aug. 3, 2012, directed to Chinese Application No. 201010283074.2; 17 pages.
Notice of Allowance mailed Feb. 12, 2013, directed to Japanese Application No. 213158/2009; 6 pages.

* cited by examiner

*Primary Examiner* — Jesse Pullias
(74) *Attorney, Agent, or Firm* — Morrison & Foerster LLP

(57) ABSTRACT

A multifunction peripheral (MFP) includes an accepting portion to accept a picked up image and a speech, a speech recognition portion to recognize the accepted speech, a display screen generating portion to generate a display screen in accordance with an output setting, and a transmission control portion to transmit the generated display screen. The display screen is generated in response to a recognized keyword included in a predetermined output setting. The display screen includes at least one of the picked up image and an image of object data stored in association with the keyword in advance and independently from the picked up image. The display screen is automatically switched including the image of object data stored in association with the recognized keyword in accordance with the output setting when a keyword is recognized by the speech recognition portion.

15 Claims, 16 Drawing Sheets

F I G. 2
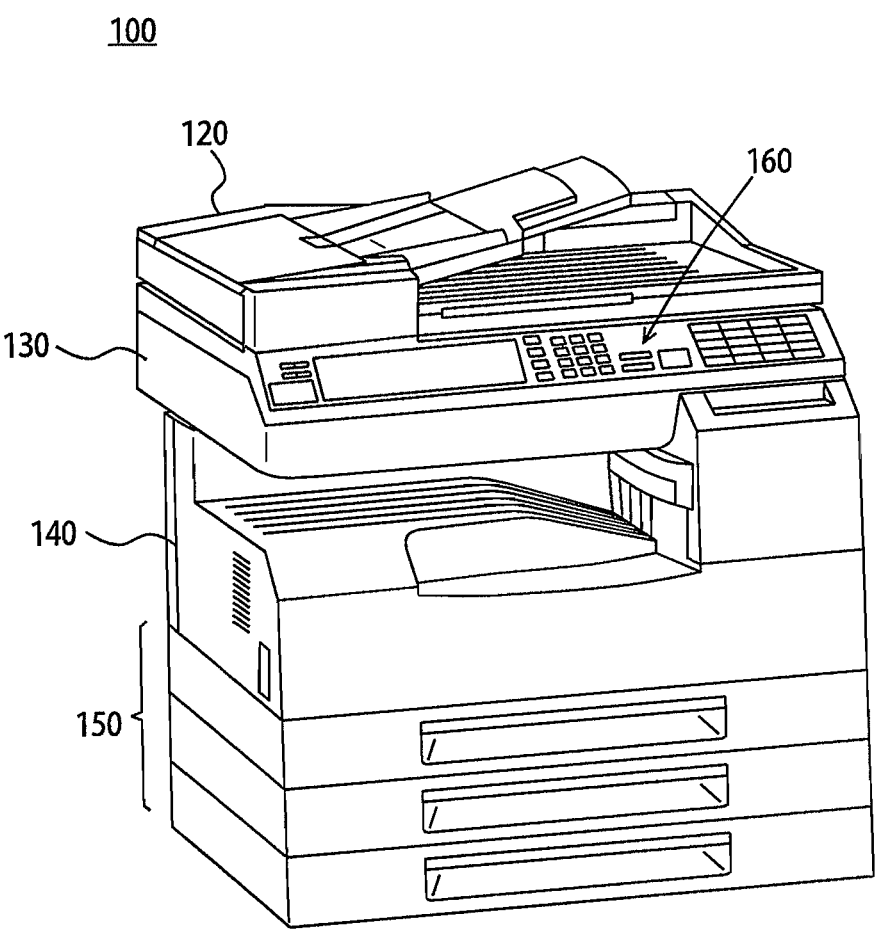

F I G. 3
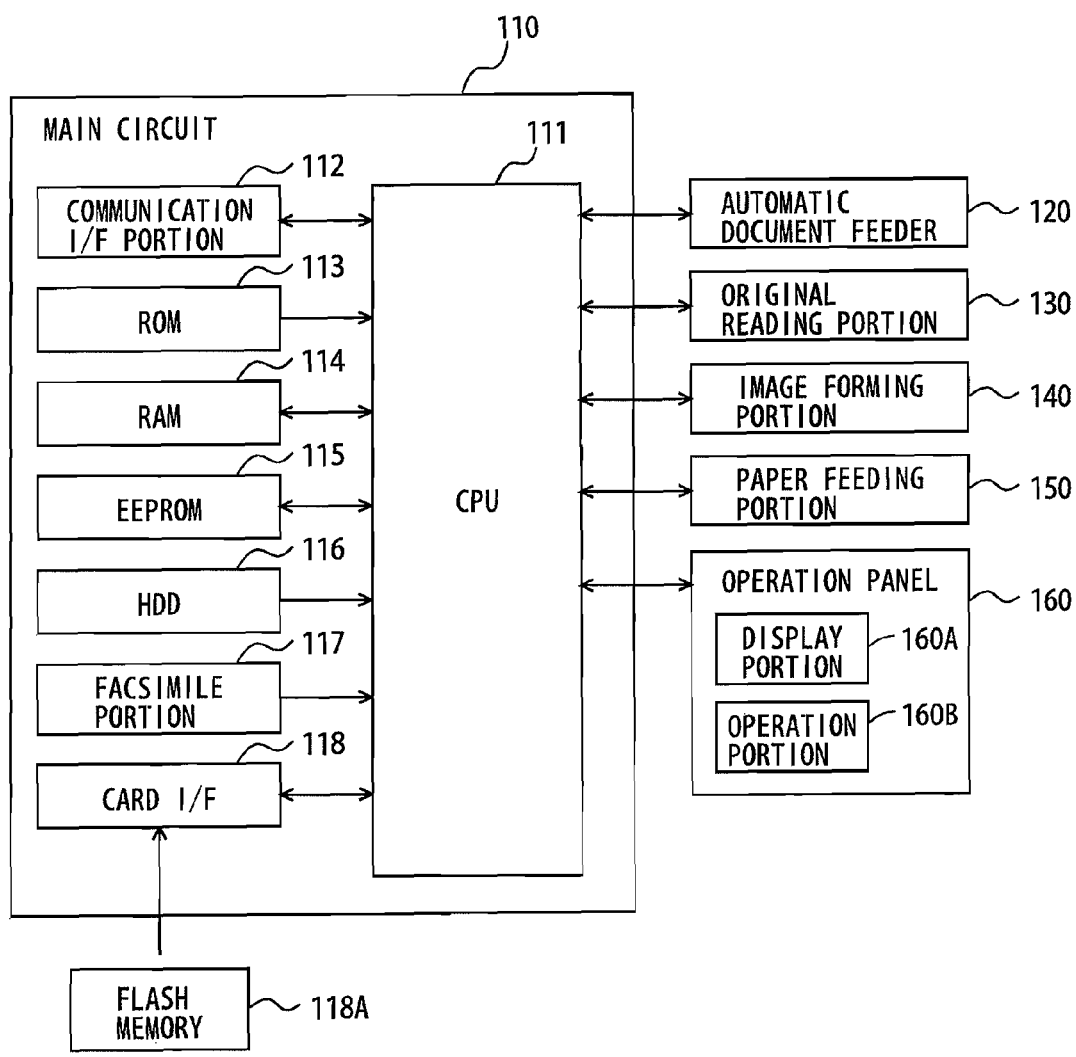

F I G. 7

| SETTER IDENTIFICATION INFORMATION | KEYWORD | DESTINATION IDENTIFICATION INFORMATION | CONTENT | METHOD |
|---|---|---|---|---|
| USER A | USER B | USER A | PRESENTATION DOCUMENT | SCREEN SPLIT |
| | | | IMAGE OF USER B'S PLACE | SCREEN SPLIT |
| USER B | PRESENTATION DOCUMENT | USER A, C, D, E | PRESENTATION DOCUMENT | FULL SCREEN |
| | PRESENTATION DOCUMENT | USER B | PRESENTATION DOCUMENT | SCREEN SPLIT |
| | | | PRESENTATION SUPPLEMENTAL DOCUMENT | SCREEN SPLIT |
| | QUESTION | USER B | PRESENTATION Qs AND As | SCREEN SPLIT |
| | | | IMAGE OF SPEAKER'S PLACE | SCREEN SPLIT |
| USER C | PRESENTATION DOCUMENT | USER C | PRESENTATION DOCUMENT | SCREEN SPLIT |
| | | | PRESENTATION AGENDA | SCREEN SPLIT |
| USER D | PRESENTATION DOCUMENT | USER D | PRESENTATION DOCUMENT | SCREEN SPLIT |
| | | | PRESENTATION COMPARISON DOCUMENT | SCREEN SPLIT |
| USER E | PRESENTATION DOCUMENT | USER E | PRESENTATION DOCUMENT | SCREEN SPLIT |
| | | | PRESENTATION AGENDA | SCREEN SPLIT |

FIG. 13

KEYWORD TABLE

| USER IDENTIFICATION INFORMATION | KEYWORD 1 | KEYWORD 2 | ... | KEYWORD n |
|---|---|---|---|---|
| USER A | QUESTION | USER A | ... | END |
| USER B | COST | MONEY | ... | CONTRACT |
| USER C | PROGRESS | SITUATION | ... | DELAY |
| USER D | MANAGEMENT | UNION | ... | RULE |
| USER E | RESOURCES | UNIT PRICE | ... | INEXPENSIVE |

F I G. 14

ACCUMULATION DATA

| USER A | | USER B | | ... | USER E | |
|---|---|---|---|---|---|---|
| WORD | COUNTER | WORD | COUNTER | | WORD | COUNTER |
| USER A | 20 | MONEY | 600 | ... | RESOURCES | 65 |
| QUESTION | 10 | COST | 600 | ... | UNIT PRICE | 40 |
| BEGINNING | 2 | APPROVAL | 40 | ... | INEXPENSIVE | 30 |
| ... | ... | ... | ... | ... | ... | ... |
| ... | ... | ... | ... | ... | ... | ... |

ACCUMULATION CONDITION TABLE

| USER IDENTIFICATION INFORMATION | NUMBER OF CONFERENCES | DETECTION CONDITION | |
|---|---|---|---|
| | | NUMBER OF TIMES OF DETECTION | DETECTION CRITERION |
| USER A | 2 | 5 | AVERAGE NUMBER OF TIMES |
| USER B | 100 | NUMBER OF CONFERENCES ×5 | TOTAL NUMBER OF TIMES |
| USER C | 20 | 10 | AVERAGE NUMBER OF TIMES |
| USER D | 5 | 10 | AVERAGE NUMBER OF TIMES |
| USER E | 3 | 20 | AVERAGE NUMBER OF TIMES |

GENERATING A DISPLAY SCREEN IN RESPONSE TO DETECTING KEYWORDS IN SPEECH

This application is based on Japanese Patent Application No. 2009-213158 filed with Japan Patent Office on Sep. 15, 2009, the entire content of which is hereby incorporated by reference.

BACKGROUND OF THE INVENTION

Field of the Invention

The present invention relates to an image transmitting apparatus, an image transmitting method, and an image transmitting program embodied on a computer readable medium. More particularly, the present invention relates to an image transmitting apparatus which transmits an image to a computer that is operated by a participant of a conference or the like, and an image transmitting method and an image transmitting program embodied on a computer readable medium which are executed by the image transmitting apparatus.

In recent years, a video conference system is known which allows a conference to be held by participants who are in physically distant conference rooms. In such a video conference system, an image picked up in a first conference room may be displayed in a second conference room so that a participant in the second conference room can see what is going on in the first conference room by looking at the display in the second conference room. A document prepared by a presenter may also be displayed. In order to cause an image to be displayed in all of a plurality of conference rooms, however, a special operation needs to be entered into the video conference system. In the case where this requires a complicated operation, only a skilled person can display the image.

Japanese Patent Laid-Open No. 2005-197945 describes a video conference system wherein a video conference terminal is configured to display on its own image display device the same screen as the one that is being displayed on another video conference terminal designated from among a plurality of other video conference terminals. According to this video conference system, when a document prepared by a presenter is displayed on a video conference terminal set in a conference room where the presenter is located, the same image as the one that is displayed in the conference room where the presenter is located is displayed on a video conference terminal set in another conference room.

With this system, however, in the video conference terminal set in the conference room where the presenter is located, the presenter needs to perform an operation of switching the images to be displayed on the video conference terminal, while in the video conference terminal set in the other conference room, a participant in that conference room needs to perform an operation of designating the video conference terminal set in the conference room where the presenter is located. Such input operations may interrupt the smooth progress of the conference.

SUMMARY OF THE INVENTION

The present invention has been accomplished to solve the foregoing problems, and an object of the present invention is to provide an image transmitting apparatus, an image transmitting method, and an image transmitting program embodied on a computer readable medium which allow a screen to be automatically switched to one suitable for a situation.

Another object of the present invention is to provide an image transmitting apparatus, an image transmitting method, and an image transmitting program embodied on a computer readable medium which are capable of providing information that facilitates understanding of the content of a speech.

In order to achieve the above-described objects, according to an aspect of the present invention, an image transmitting apparatus includes: an accepting portion to accept an image and a speech; a speech recognition portion to recognize the accepted speech; a screen generating portion, in response to an event that a keyword included in a predetermined output setting is recognized by the speech recognition portion, to generate a display screen in accordance with the output setting, the display screen including at least one of the accepted image and an image of object data that is stored in advance independently from the accepted image; and a transmission control portion to transmit, in accordance with the output setting, the generated display screen to at least one of a plurality of computers operated respectively by a plurality of users.

According to another aspect of the present invention, an image transmitting apparatus includes: an accepting portion to accept an image and a speech; a user specifying portion to specify, on the basis of the accepted speech, one of a plurality of users who has uttered the speech; an extracting portion to extract a word from a character string obtained by recognizing the accepted speech; a counting portion to count the extracted word for each of the specified users; and a transmission control portion, in the case where the counted result is equal to or greater than a predetermined frequency for any one of the extracted words, to transmit a screen that includes the word to at least one of a plurality of computers operated respectively by the plurality of users.

According to a further aspect of the present invention, an image transmitting method includes the steps of: accepting an image and a speech; recognizing the accepted speech; generating, in response to an event that a keyword included in a predetermined output setting is recognized in said recognizing step, a display screen in accordance with the output setting, the display screen including at least one of the accepted image and an image of object data that is stored in advance independently from the accepted image; and transmitting, in accordance with the output setting, the generated display screen to at least one of a plurality of computers operated respectively by a plurality of users.

According to a still further aspect of the present invention, an image transmitting method includes the steps of: accepting an image and a speech; specifying, on the basis of the accepted speech, one of a plurality of users who has uttered the speech; extracting a word from a character string obtained by recognizing the accepted speech; counting the extracted word for each of the specified users; and in the case where the counted result is equal to or greater than a predetermined frequency for any one of the extracted words, transmitting a screen that includes the word to at least one of a plurality of computers operated respectively by the plurality of users.

According to yet another aspect of the present invention, an image transmitting program embodied on a computer readable medium causes a computer to perform the steps of: accepting an image and a speech; recognizing the accepted speech; generating, in response to an event that a keyword included in a predetermined output setting is recognized in said recognizing step, a display screen in accordance with the output setting, the display screen including at least one of the accepted image and an image of object data that is stored in advance independently from the accepted image; and transmitting, in accordance with the output setting, the generated display screen to at least one of a plurality of computers operated respectively by a plurality of users.

According to still another aspect of the present invention, an image transmitting program embodied on a computer readable medium causes a computer to perform the steps of: accepting an image and a speech; specifying, on the basis of the accepted speech, one of a plurality of users who has uttered the speech; extracting a word from a character string obtained by recognizing the accepted speech; counting the extracted word for each of the specified users; and in the case where the counted result is equal to or greater than a predetermined frequency for any one of the extracted words, transmitting a screen that includes the word to at least one of a plurality of computers operated respectively by the plurality of users.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a perspective view of an MFP.

FIG. 3 is a block diagram showing, by way of example, the hardware configuration of the MFP.

FIG. 7 shows an example of an output setting table.

FIG. 13 shows an example of a keyword table.

FIG. 14 shows an example of accumulation data.

DESCRIPTION OF THE PREFERRED EMBODIMENTS

Figure 1:
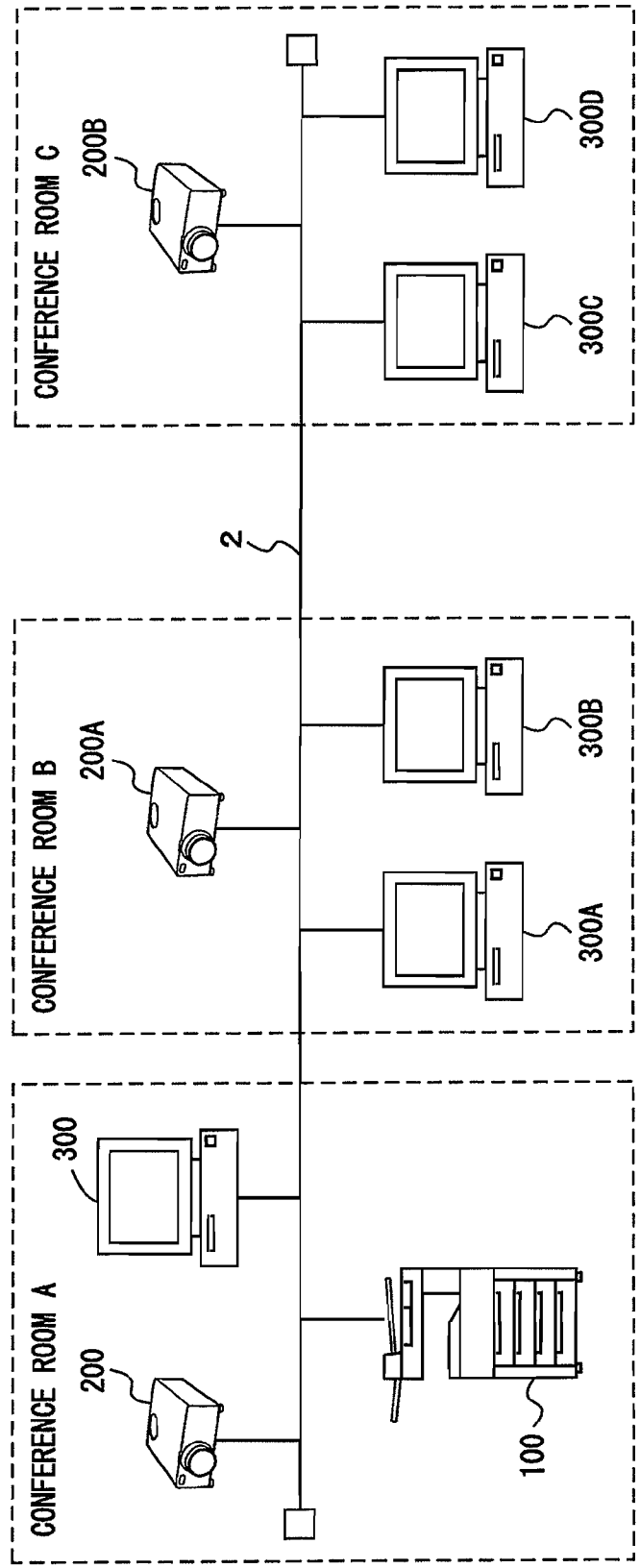
FIG. 1 schematically shows a conference system according to an embodiment of the present invention.

Embodiments of the present invention will now be described with reference to the drawings. In the following description, like reference characters denote like parts, which have like names and functions, and therefore, detailed description thereof will not be repeated.

FIG. 1 schematically shows a conference system according to an embodiment of the present invention. Referring to FIG. 1, a conference system 1 is arranged in conference rooms A, B, and C, which are spaces physically distant from each other and through which a network 2 is placed. In conference room A, a multi function peripheral (MFP) 100, a video conference terminal 200, and a personal computer (hereinafter, referred to as "PC") 300 are installed, which are each connected to network 2. In conference room B, a video conference terminal 200A and PCs 300A and 300B are installed, which are each connected to network 2. In conference room C, a video conference terminal 200B and PCs 300C and 300D are installed, which are each connected to network 2. MFP 100 is capable of communicating with video conference terminal 200, 200A, and 200B and PCs 300 and 300A to 300D via network 2. MFP 100 functions as an image transmitting apparatus so as to transmit an image of a display screen to PCs 300 and 300A to 300D.

Network 2 is a local area network (LAN), which may be connected in a wired or wireless manner. Further, not limited to the LAN, network 2 may be a wide area network (WAN), public switched telephone networks (PSTN), the Internet, or the like.

While the arrangement of three physically distant spaces of conference rooms A, B, and C is shown here by way of example, the number of spaces is not limited thereto; the space may be one of conference rooms A, B, and C, or may be a group of at least two rooms selected from among a plurality of conference rooms.

Each of PCs 300 and 300A to 300D is a typical computer, and is installed with an application program allowing the PC to communicate with MFP 100. The application program may be, e.g., a browser program for downloading a Web page stored in MFP 100 serving as a Web server. Each of PCs 300 and 300A to 300D is also installed with a moving image reproduction program for decoding moving image data to reproduce a moving image.

MFP 100 includes a scanner device for reading an original, and an image forming device and a facsimile device for forming an image based on image data on a recording medium such as a sheet of paper, and has the image reading function, copying function, and facsimile transmitting/receiving function. Furthermore, MFP 100 is installed with a program allowing MFP 100 to serve as a Web server and a streaming transmission server. While MFP 100 is described as an example of the image transmitting apparatus in the present embodiment, not limited to MFP 100, the image transmitting apparatus may be a printer, a facsimile machine, a personal computer, or the like.

FIG. 2 is a perspective view of the MFP. FIG. 3 is a block diagram showing, by way of example, the hardware configuration of the MFP. Referring to FIGS. 2 and 3, MFP 100 includes: a main circuit 110; an original reading portion 130 which reads an original; an automatic document feeder 120 which delivers an original to original reading portion 130; an image forming portion 140 which forms, on a sheet of paper or the like, a still image output from original reading portion 130 that read an original; a paper feeding portion 150 which supplies sheets of paper to image forming portion 140; and an operation panel 160 serving as a user interface. Main circuit 110 includes a central processing unit (CPU) 111, a communication interface (I/F) portion 112, a read only memory (ROM) 113, a random access memory (RAM) 114, an electrically erasable and programmable ROM (EEPROM) 115, a hard disk drive (HDD) 116 as a mass storage, a facsimile portion 117, and a card interface (I/F) 118 which may be mounted with a flash memory 118A. CPU 111 is connected with automatic document feeder 120, original reading portion 130, image forming portion 140, paper feeding portion 150, and operation panel 160, and is responsible for overall control of MFP 100.

ROM 113 stores a program to be executed by CPU 111 as well as data necessary for execution of the program. RAM 114 is used as a work area when CPU 111 executes a program. Further, RAM 114 temporarily stores still images that are continuously transmitted from original reading portion 130.

Operation panel 160 is provided on an upper surface of MFP 100, and includes a display portion 160A and an operation portion 160B. Display portion 160A is a display such as a liquid crystal display (LCD) or an organic electro-luminescence display (ELD), and displays an instruction menu for the user, information about acquired image data, and others. Operation portion 160B is provided with a plurality of keys, and accepts input of data such as instructions, characters, and numerical characters, according to the key operations of the user. Operation portion 160B further includes a touch panel provided on display portion 160A.

Communication I/F portion 112 is an interface for connecting MFP 100 to network 2. CPU 111 communicates with video conference terminals 200, 200A, 200B or PCs 300, 300A to 300D via communication I/F portion 112 to transmit/receive data. Further, communication I/F portion 112 is capable of communicating with a computer connected to the Internet via network 2.

Facsimile portion 117 is connected to public switched telephone networks (PSTN), and transmits facsimile data to or receives facsimile data from the PSTN. Facsimile portion 117 stores the received facsimile data in HDD 116, or outputs it to image forming portion 140. Image forming portion 140 prints the facsimile data received from facsimile portion 117 on a sheet of paper. Further, facsimile portion 117 converts the data stored in HDD 116 to facsimile data, and transmits it to a facsimile machine connected to the PSTN.

Card I/F 118 is mounted with flash memory 118A. CPU 111 is capable of accessing flash memory 118A via card I/F 118. CPU 111 loads a program recorded on flash memory 118A mounted to card I/F 118, to RAM 114 for execution. It is noted that the program executed by CPU 111 is not restricted to the program recorded on flash memory 118A. CPU 111 may load a program stored in HDD 116 to RAM 114 for execution. In this case, another computer connected to network 2 may rewrite the program stored in HDD 116 of MFP 100 or may additionally write a new program. Further, MFP 100 may download a program from another computer connected to network 2, and store the program in HDD 116. As used herein, the "program" includes, not only the program directly executable by CPU 111, but also a source program, a compressed program, an encrypted program, and others.

Figure 4:
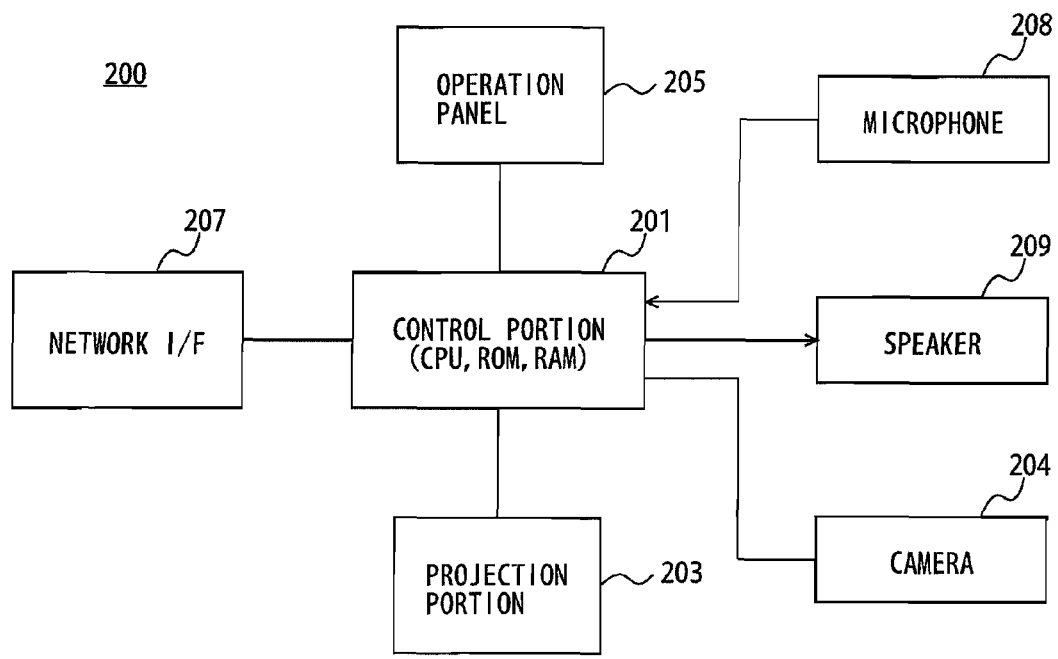
FIG. 4 is a functional block diagram schematically showing, by way of example, the functions of a video conference terminal.

Video conference terminals 200, 200A, and 200B are identical in configuration and function, and thus, video conference terminal 200 will now be described representatively. FIG. 4 is a functional block diagram schematically showing, by way of example, the functions of a video conference terminal. Referring to FIG. 4, video conference terminal 200 includes: a control portion 201 responsible for overall control of video conference terminal 200; a network I/F 207 for connecting video conference terminal 200 to network 2; an operation panel 205; a projection portion 203 for projecting an image; a camera 204 for picking up an image of the inside of a conference room; a microphone 208 for collecting a speech; and a speaker 209 for outputting a speech.

Camera 204 picks up an image of the inside of conference room A, and outputs the resultant video data to control portion 201. Microphone 208 collects sound, and outputs the audio data to control portion 201.

Control portion 201 includes a CPU, a RAM used as a work area, and a ROM for storing a program executed by the CPU. Control portion 201 receives video data from camera 204 and audio data from microphone 208, and outputs them via network I/F 207 to other video conference terminals 200A and 200B and to MFP 100. As a result, the video image picked up in conference room A and the speech collected in conference room A are output to video conference terminals 200A and 200B. Similarly, video conference terminal 200A transmits video data obtained by picking up an image of the inside of conference room B and audio data collected in conference room B to MFP 100. Video conference terminal 200B transmits video data obtained by picking up an image of the inside of conference room C and audio data collected in conference room C to MFP 100. As a result, MFP 100 receives the video data obtained by picking up images in conference rooms A, B, and C and the audio data collected in conference rooms A, B, and C.

Furthermore, control portion 201, on receipt of video data from other video conference terminals 200A and 200B via network I/F 207, converts the format of the video data to the one suitable for projection, and outputs the resultant projection data to projection portion 203. Control portion 201 also outputs the audio data received from other video conference terminals 200A and 200B to speaker 209. As a result, the video images showing the insides of conference rooms B and C as well as the speeches collected in conference rooms B and C are output from video conference terminal 200.

Projection portion 203 includes a liquid crystal display, a lens, and a light source. The liquid crystal display displays video data input from control portion 201. Light emitted from the light source transmits the liquid crystal display and is directed via the lens to the outside. When the light emitted from projection portion 203 hits a screen, an enlarged version of the image displayed on the liquid crystal display is thrown onto the screen. It is noted that a wall or any other highly reflective surface may be used, in which case the screen is unnecessary. Operation panel 205 is a user interface, and includes a display portion such as a liquid crystal display and an operation portion having a plurality of keys.

While it is here assumed that video conference terminals 200, 200A, and 200B each have projection portion 203, projection portion 203 may be replaced with a display such as an LCD or an organic ELD.

Figure 5:
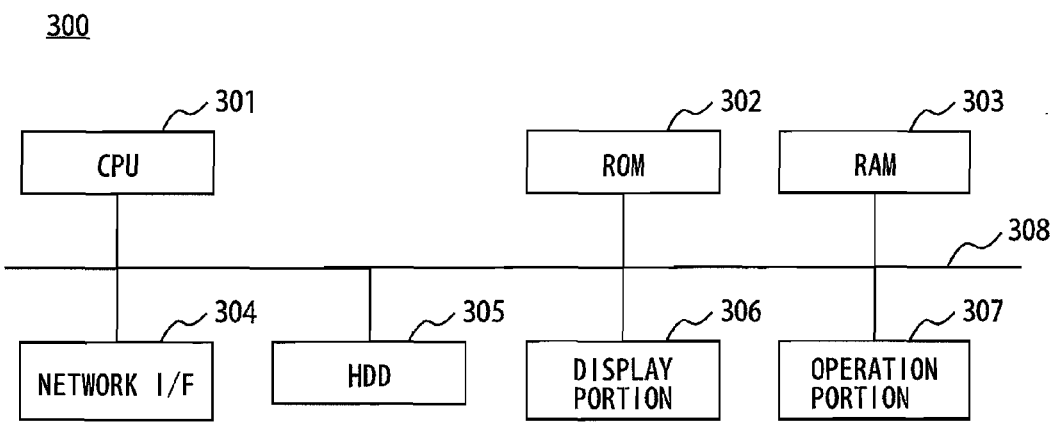
FIG. 5 is a block diagram showing, by way of example, the hardware configuration of a PC.

PCs 300 and 300A to 300D are identical in configuration and function, and thus, PC 300 will now be described representatively. FIG. 5 is a block diagram showing, by way of example, the hardware configuration of the PC. Referring to FIG. 5, PC 300 includes: a CPU 301 which is responsible for overall control of PC 300; a ROM 302 for storing, among others, a program to be executed by CPU 301; a RAM 303 used as a work area for CPU 301; a network I/F 304 for connecting PC 300 to a network; a HDD 305 as a mass storage; a display portion 306; and an operation portion 307 for accepting an input of a user's operation.

In the present embodiment, participants to the conference operate corresponding ones of PCs 300 and 300A to 300D. PCs 300 and 300A to 300D each display, on its display portion 306, a display screen received from MFP 100. The display screen includes images picked up by video conference terminals 200, 200A, and 200B. This allows the participants to look at the images displayed on video conference terminals 200, 200A, and 200B on PCs 300 and 300A to 300D. The display screen may also include an image of a document prepared for the conference by a participant. When a participant stores a document prepared for the conference in the form of electronic data in one of PCs 300 and 300A to 300D and transmits the document to MFP 100 for storage therein, MFP 100 generates a display screen including the image of the document prepared by the participant. A specific example where a display screen generated by MFP 100 is displayed on PCs 300 and 300A to 300D will be described below.

Figure 6:
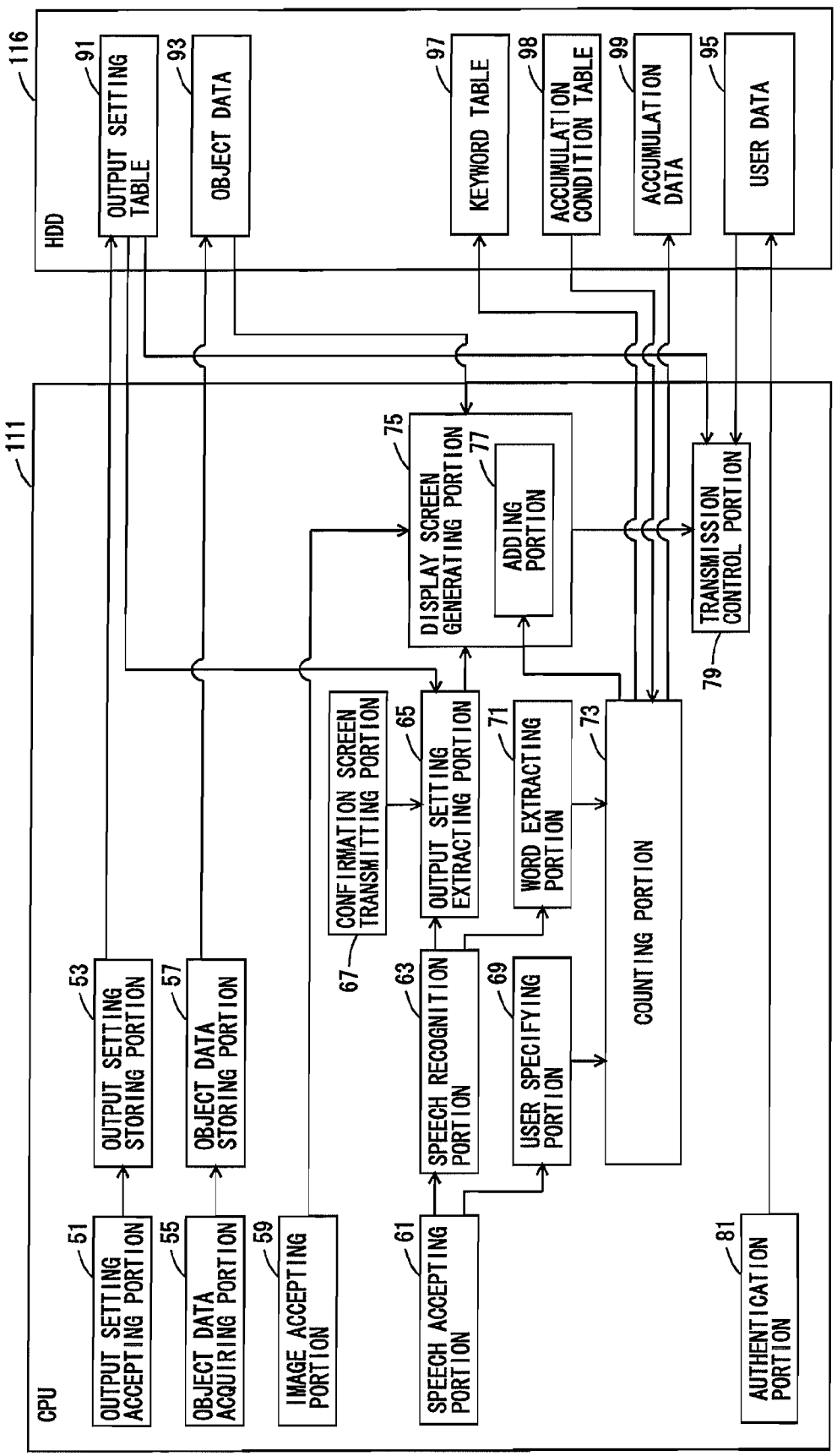
FIG. 6 is a functional block diagram showing, by way of example, the functions of a CPU included in the MFP, together with data stored in a HDD.

FIG. 6 is a functional block diagram showing, by way of example, the functions of the CPU included in the MFP, together with data stored in the HDD. Referring to FIG. 6, the functions implemented by CPU 111 included in MFP 100 includes: an output setting accepting portion 51 to accept an output setting; an output setting storing portion 53 to store an output setting in HDD 116; an object data acquiring portion 55 to acquire object data; an object data storing portion 57 to store object data in HDD 116; and an authentication portion 81 to authenticate a user.

Authentication portion 81 authenticates a participant. In the case where a participant logs in on MFP 100 by operating one of PCs 300 and 300A to 300D, the PC operated by the participant transmits user identification information for identifying the participant to MFP 100. When communication I/F portion 112 receives user identification information from one of PCs 300 and 300A to 300D, authentication portion 81 acquires the user identification information, device identification information for identifying the PC from which the user identification information was transmitted, and conference room identification information for specifying the conference room in which the user is located. The device identification information may be any type of information as long as it can identify each of PCs 300 and 300A to 300D. Here, network addresses assigned to the respective PCs in network 2 are used as the device identification information.

Authentication portion 81 stores in HDD 116 user data which includes a set of user identification information, device identification information, and conference room identification information. In this manner, user data 95 is stored in HDD 116. User data 95 includes a set of the user identification information for identifying a participant, the device identification information of the PC operated by the participant, and the conference room identification information. Thus, the device identification information of each of PCs 300 and 300A to 300D can be used to specify the participant who is operating the PC and the conference room in which the participant is located. Here, it is assumed that user A in conference room A, users B and C in conference room B, and users D and E in conference room C operate PCs 300 and 300A to 300D, respectively, to log in on MFP 100. Data associating user identification information with a password may be stored in advance, so as to allow only predetermined participants to log in on MFP 100.

When communication I/F portion 112 receives an output setting from one of PCs 300 and 300A to 300D, output setting accepting portion 51 accepts the received output setting and the device identification information for identifying the one of PCs 300 and 300A to 300D from which the output setting was transmitted. Output setting accepting portion 51 outputs the accepted output setting and device identification information to output setting storing portion 53. The output setting includes a parameter for setting a display screen to be displayed on PCs 300 and 300A and 300D operated by participants. The output setting includes one for setting a display screen to be displayed on one of PCs 300 and 300A to 300D that is operated by the participant him/herself, and one for setting a display screen to be displayed on one of PCs 300 and 300A to 300D that is operated by another participant.

Output setting storing portion 53, on receipt of the output setting and the device identification information, uses the device identification information to search user data 95 so as to acquire user identification information that makes a pair with the device identification information. Output setting storing portion 53 then generates an output setting record including the user identification information and the output setting, and additionally stores the generated record in an output setting table 91 stored in HDD 116.

FIG. 7 shows an example of an output setting table. The output setting table includes at least one output setting record. The output setting record includes the fields of setter identification information, keyword, destination identification information, content, and method. In the setter identification information field, the user identification information for the participant who has transmitted the output setting is set. Specifically, the user identification information that is input to output setting storing portion 53 together with the output setting is set in this field.

The keyword field, the destination identification information field, the content field, and the method field constitute the output setting. In the keyword, destination identification information, content, and method fields, the corresponding values included in the output setting input from output setting storing portion 53 are set. In the keyword field, a character string constituting a keyword is set. In the destination identification information field, user identification information for identifying a participant to whom the display screen generated on the basis of the output setting is to be transmitted is set. In the content field, data identification information for identifying a content based on which an image included in the display screen is to be generated is set. In the method field, a method according to which an image is to be arranged on an output screen is set.

Returning to FIG. 6, when communication I/F portion 112 receives object data from one of PCs 300 and 300A to 300D, object data acquiring portion 55 acquires the received object data and device identification information for identifying the one of PCs 300 and 300A to 300D that transmitted the object data. Object data acquiring portion 55 outputs the acquired object data and device identification information to object data storing portion 57. The object data is a document prepared by a participant in the form of electronic data. Specifically, the object data includes an image, or application data that is generated when an application program is executed by one of PCs 300 and 300A to 300D.

Object data of a predetermined type is assigned a predetermined file name. Here, the object data which is a main document for the presentation is assigned a file name "presentation document". The object data which is a supplemental document for the presentation is assigned a file name "presentation supplemental document". The object data which shows an agenda of the presentation is assigned a file name "presentation agenda". These file names are used for determination of object data when generating a display screen, as will be described later. The file names assigned to object data are not limited to those described above; arbitrary names may be determined in advance as appropriate. In the case where the participants are classified into groups, object data issued by the participants may be classified into groups corresponding to those of the participants. For example, in the case where the participants are classified as presenters and audience, the object data may be classified as the object data issued by the presenters and the object data issued by the audience. This allows, upon generation of a display screen as will be described later, the object data to be determined in accordance with the group to which it belongs.

Object data storing portion 57, when receiving the object data and the device identification information, uses the device identification information to search user data 95 so as to acquire user identification information that makes a pair with the device identification information. Object data storing portion 57 then stores, in HDD 116, the object data in association with the user identification information. As a result, object data 93 is stored in HDD 116.

CPU 111 further includes: an image accepting portion 59 to accept an image; a speech accepting portion 61 to accept a speech; a speech recognition portion 63 to recognize a speech to output a character string; an output setting extracting portion 65 to extract an output setting on the basis of a character string; a display screen generating portion 75 to generate a display screen; a transmission control portion 79 to transmit a generated display screen; a confirmation screen transmitting portion 67; a user specifying portion 69 to specify a user who uttered a speech; a word extracting portion 71 to extract a word from a character string; and a counting portion 73 to count an extracted word.

In the case where communication I/F portion 112 receives image data from one of video conference terminals 200, 200A, and 200B, image accepting portion 59 accepts the received image data and device identification information for identifying the one of video conference terminals 200, 200A, and 200B that transmitted the image data. Image accepting portion 59 outputs the accepted image data and device identification information to display screen generating portion 75. Here, the image data includes moving and still images.

In the case where communication I/F portion 112 receives audio data from one of video conference terminals 200, 200A, and 200B, speech accepting portion 61 accepts the received audio data and device identification information for identifying the one of video conference terminals 200, 200A, and 200B that transmitted the audio data. Speech accepting portion 61 outputs the accepted audio data and device identification information to speech recognition portion 63 and user specifying portion 69.

Speech recognition portion 63, when receiving audio data from speech accepting portion 61, performs speech recognition on the basis of the audio data, to convert the speech into a character string. Speech recognition portion 63 outputs the character string obtained through conversion of the speech, to output setting extracting portion 65 and word extracting portion 71.

Output setting extracting portion 65 extracts, from the output setting records included in output setting table 91 stored in HDD 116, any output setting record including the same keyword as part of the character string input from speech recognition portion 63. In the case where a single output setting record has been extracted from output setting table 91, output setting extracting portion 65 outputs the extracted output setting record to display screen generating portion 75.

In the case where two or more output setting records having the same keyword have been extracted, output setting extracting portion 65 refers to the destination identification information field in each of the extracted output setting records. Then, as for the user identification information set in only one of the extracted output setting records, output setting extracting portion 65 selects that user identification information and the one of the output setting records having that user identification information set in the destination identification information field, and outputs the set of the selected output setting record and the user identification information to display screen generating portion 75.

For example, in the case where the output setting table shown in FIG. 7 is stored in HDD 116, the output setting table includes five output setting records having "presentation document" set in the keyword field. Thus, the five output setting records having "presentation document" set in the keyword field may be extracted by output setting extracting portion 65. Referring to the destination identification information fields of the five output setting records, "user A" and "user B" each correspond to the user identification information that is set in only one of the five output setting records. In this case, a set of the user identification information "user A" and the output setting having "presentation document" set in the keyword field and "users A, C, D, and E" set in the destination identification information field is output to display screen generating portion 75, and a set of the user identification information "user B" and the output setting having "presentation document" set in the keyword field and "user B" set in the destination identification information field is also output to display screen generating portion 75.

In the case where two or more output setting records including the same keyword have been extracted, output setting extracting portion 65 refers to the destination identification information fields in the extracted output setting records, as described above. Then, in the case where the same user identification information is set in two or more of the output setting records, output setting extracting portion 65 extracts one of those output setting records in which the same user identification information as the one set in the destination identification information field is set in the setter identification information field, in precedence to another one of those output setting records in which user identification information different from the one set in the destination identification information field is set in the setter identification information field. In other words, in the case where a participant him/herself and another participant have set output settings for the participant, the output setting set by the participant him/herself is selected in preference to the output setting set by the other participant. Here, the output setting record in which the user identification information set in the destination identification information field is identical to the one set in the setter identification information field is called a "self-set record", while the output setting record in which the user identification information set in the destination identification information field is different from the one set in the setter identification information field is called an "other-set record".

Output setting extracting portion 65 then outputs a set of the user identification information that is set commonly in the destination identification information fields of the two or more output setting records and the preferentially selected self-set record to display screen generating portion 75, and outputs a set of the user identification information set commonly in the destination identification information fields of the two or more output setting records and the other-set record to confirmation screen transmitting portion 67, For example, in the case where the output setting table shown in FIG. 7 is stored in HDD 116, the output setting table includes five output setting records having "presentation document" set in the keyword field, and the user identification information "user C", "user D", and "user E" are each set commonly in the destination identification information fields of two or more of the five output setting records. In this case, the output setting record having the user identification information "user C" set in both of the destination identification information field and the setter identification information field (i.e. the self-set record by user C) is selected in preference to the output setting record having the user identification information "users A, C, D, and E" set in the destination identification information field (i.e. the other-set record for user C). Then, the set of the user identification information "user C" and the output setting record (the self-set record) having the user identification information "user C" set in both of the destination identification information field and the setter identification information field is output to display screen generating portion 75, while the set of the user identification information "user C" and the output setting record (the other-set record) having the user identification information "users A, C, D, and E" set in the destination identification information field is output to confirmation screen transmitting portion 67.

Similarly, the output setting record having the user identification information "user D" set in both of the destination identification information field and the setter identification information field (i.e. the self-set record by user D) is selected in preference to the output setting record having the user identification information "users A, C, D, and E" set in the destination identification information field (i.e. the other-set record for user D). Then, the set of the user identification information "user D" and the output setting record (the self-set record) having the user identification information "user D" set in both of the destination identification information field and the setter identification information field is output to display screen generating portion 75, while the set of the user identification information "user D" and the output setting record (the other-set record) having the user identification information "users A, C, D, and E" set in the destination identification information field is output to confirmation screen transmitting portion 67.

Still further, the output setting record having the user identification information "user E" set in both of the destination identification information field and the setter identification information field (i.e. the self-set record by user E) is selected in preference to the output setting record having the user identification information "users A, C, D, and E" set in the destination identification information field (i.e. the other-set record for user E). Then, the set of the user identification information "user E" and the output setting record (the self-set record) having the user identification information "user E" set in both of the destination identification information field and the setter identification information field is output to display screen generating portion 75, while the set of the user identification information "user E" and the output setting record (the other-set record) having the user identification information "users A, C, D, and E" set in the destination identification information field is output to confirmation screen transmitting portion 67.

Confirmation screen transmitting portion 67 generates a confirmation screen on the basis of the output setting record (the other-set record) input from output setting extracting portion 65, and transmits the generated confirmation screen to one of PCs 300 and 300A to 300D that is operated by the user identified by the user identification information input from output setting extracting portion 65. The confirmation screen is for confirming whether to display the display screen that is generated in accordance with the output setting set by another participant in place of the display screen that is generated in accordance with the output setting set by the participant him/herself.

Specifically, another participant refers to the participant who is specified by the user identification information set in the setter identification information field of the output setting record input from output setting extracting portion 65. The confirmation screen includes the user identification information that is set in the setter identification information field of the output setting record input from output setting extracting portion 65, and further includes a message inquiring whether to switch the display screen to the one generated in accordance with the output setting set by the participant specified by that user identification information, an approval button for accepting an instruction to permit switching of the screen, and a disapproval button for accepting an instruction not to permit the switching thereof.

Confirmation screen transmitting portion 67 uses the user identification information input from output setting extracting portion 65 to search user data 95 stored in HDD 116, so as to specify one of PCs 300 and 300A to 300D that is operated by the user identified by the user identification information input from output setting extracting portion 65. Here, PC 300B operated by "user C", PC 300C operated by "user D", and PC 300D operated by "user E" are specified. Then, confirmation screen transmitting portion 67 transmits the generated confirmation screen via communication I/F portion 112 to the specified PCs 300B, 300C, and 300D, and in turn, the confirmation screen is displayed on display portion 306 in each of the specified PCs 300B, 300C, and 300D. When one of the participants, user C, D, or E, who is looking at the confirmation screen designates the approval button permitting switching of the display to the display screen generated in accordance with the output setting set by another participant (user B in this case), the corresponding PC returns an enable signal to MFP 100. When the participant designates the disapproval button, the PC returns a disable signal to MFP 100.

In the case where confirmation screen transmitting portion 67 receives an enable signal from one of PCs 300B, 300C, and 300D to which the confirmation screen was transmitted, confirmation screen transmitting portion 67 outputs a switching instruction and the user identification information of the user who is operating the one of PCs 300B, 300C, and 300D from which the enable signal was received, to output setting extracting portion 65.

Output setting extracting portion 65, on receipt of the user identification information and the switching instruction from confirmation screen transmitting portion 67, outputs a set of the user identification information and the other-set record corresponding to that user identification information, to display screen generating portion 75. In the above example, when user C has designated the approval button, the set of the user identification information "user C" and the output setting record (the other-set record) having the user identification information "users A, C, D, and E" set in the destination identification information field is output to display screen generating portion 75. When user D has designated the approval button, the set of the user identification information "user D" and the output setting record (the other-set record) having the user identification information "users A, C, D, and E" set in the destination identification information field is output to display screen generating portion 75. When user E has designated the approval button, the set of the user identification information "user E" and the output setting record (the other-set record) having the user identification information "users A, C, D, and E" set in the destination identification information field is output to display screen generating portion 75.

Display screen generating portion 75 receives image data from image accepting portion 59, and generates a display screen including the image data and outputs the generated display screen to transmission control portion 79. Transmission control portion 79 searches user data 95 stored in HDD 116 so as to specify the device identification information of all the PCs 300 and 300A and 300D operated by the participants, and outputs all the specified device identification information and the display screen to communication I/F portion 112 to cause it to transmit the display screen to each of PCs 300 and 300A to 300D specified by the device identification information.

Figure 8:
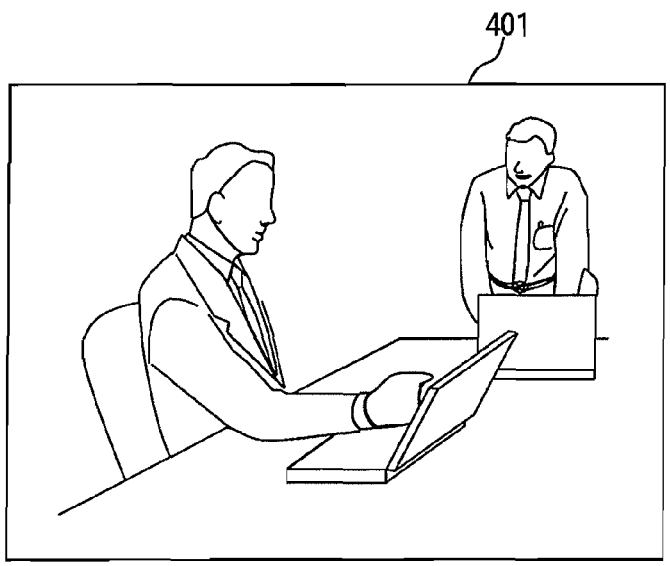
FIG. 8 shows an example of a display screen.

FIG. 8 shows an example of a display screen. Referring to FIG. 8, a display screen 401 includes a video image obtained by picking up an image of the inside of conference room B. Display screen 401 shows a screen displayed on PC 300 installed in conference room A. It is the same screen as the one that is displayed on video conference terminal 200.

Returning to FIG. 6, in the case where only an output setting record is input from output setting extracting portion 65, display screen generating portion 75 generates a display screen in accordance with the output setting record, and outputs the generated display screen and the user identification information that is set in the destination identification information field of the output setting record to transmission control portion 79. Here, the display screen that is generated by display screen generating portion 75 in accordance with an output setting record is particularly called a "custom display screen". Specifically, display screen generating portion 75 generates a custom display screen including an image of the data that is set in the content field of the output setting record, by the method that is set in the method field of the output setting record, and outputs the custom display screen together with the user identification information set in the destination identification information field of the output setting record to transmission control portion 79.

For example, assume that the output setting table shown in FIG. 7 is stored in HDD 116 and that the output setting record including "user B" in the keyword field is extracted by output setting extracting portion 65. In this case, the output setting record including "user B" in the keyword field is input to display screen generating portion 75. In this output setting record, "presentation document" and "image of user B's place" are set in the content field, and "screen split" is set in the method field. Thus, a custom display screen is generated so as to include an image of the "presentation document", which is object data 93 stored in advance in HDD 116 by a participant identified by the user identification information "user A" that is set in the setter identification information field, and an image of the inside of conference room B where a participant identified by the user identification information "user B" is located, i.e., an image of the video data received from video conference terminal 200A by image accepting portion 59. This custom display screen is divided into two areas where the image of the "presentation document" and the image of conference room B where user B is located are displayed respectively.

Furthermore, in the output setting record, "user A" is set in the destination identification information field, and therefore, the user identification information "user A" and the custom display screen are output to transmission control portion 79.

On the other hand, in the case where a set of an output setting record and user identification information is input from output setting extracting portion 65, display screen generating portion 75 generates a custom display screen in accordance with the output setting record and outputs the generated custom display screen together with the input user identification information to transmission control portion 79. Specifically, display screen generating portion 75 generates a custom display screen including an image of the data that is set in the content field of the output setting record by the method that is set in the method field thereof, and outputs the custom display screen and the user identification information input from output setting extracting portion 65, to transmission control portion 79.

Transmission control portion 79 uses the user identification information input from display screen generating portion 75 to search user data 95 stored in HDD 116 so as to extract user data including the user identification information, and thus to specify the device identification information of the PC that is operated by the user specified by the user identification information. Transmission control portion 79 outputs the specified device identification information and the display screen to communication I/F portion 112 to cause it to transmit the custom display screen to the PC specified by the device identification information.

Figure 9:
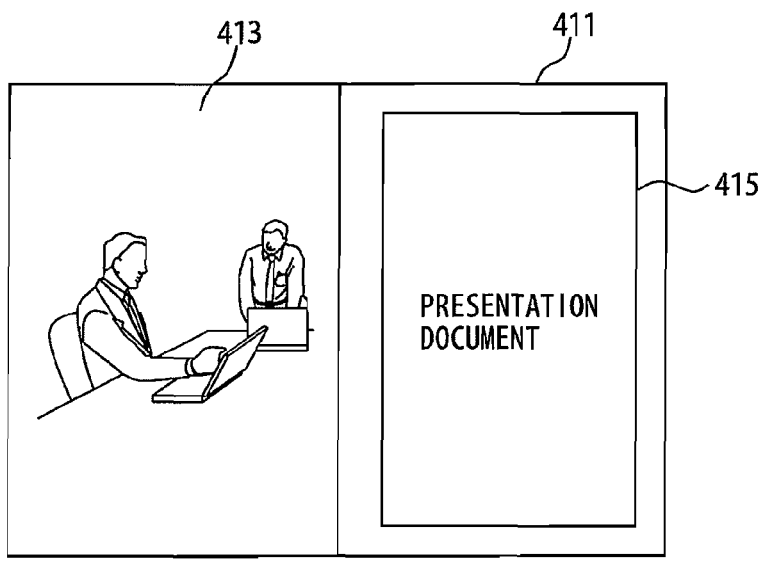
FIG. 9 shows an example of a custom display screen.

FIG. 9 shows an example of the custom display screen. The custom display screen 411 shown in FIG. 9 is displayed on PC 300 operated by user A in the case where the output setting record including "user B" in the keyword field is extracted. Referring to FIG. 9, custom display screen 411 includes an area 413 and an area 415. In area 413, an image showing the inside of conference room B where "user B" is located, i.e., an image of the video data received from video conference terminal 200A by image accepting portion 59, is displayed. In area 415, an image of object data 93 having the file name "presentation document" among object data 93 stored in advance in HDD 116 is displayed. While characters "presentation document" are shown in area 415 in the drawing, actually, the image of object data 93 is displayed therein.

Figure 10:
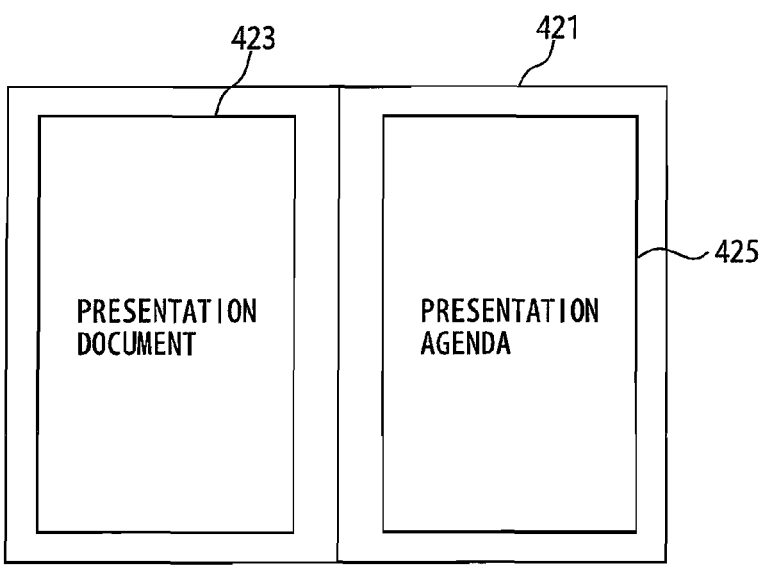
FIG. 10 shows another example of the custom display screen.

FIG. 10 shows another example of the custom display screen. The custom display screen 421 shown in FIG. 10 is displayed on PC 300B operated by user C in the case where a plurality of output setting records including "presentation document" in their keyword field are extracted. This custom display screen 421 is a display screen generated on the basis of the output setting set by user C. Referring to FIG. 10, custom display screen 421 includes an area 423 and an area 425. In area 423, an image of object data 93 having the file name "presentation document" among object data 93 stored in advance in HDD 116 is displayed. In area 425, an image of object data 93 having the file name "presentation agenda" among object data 93 stored in advance in HDD 116 is displayed. While characters "presentation document" and "presentation agenda" are shown in the respective areas 423 and 425 in the drawing, actually, the images of object data 93 having the file names "presentation document" and "presentation agenda" are displayed in the respective areas.

Figure 11:
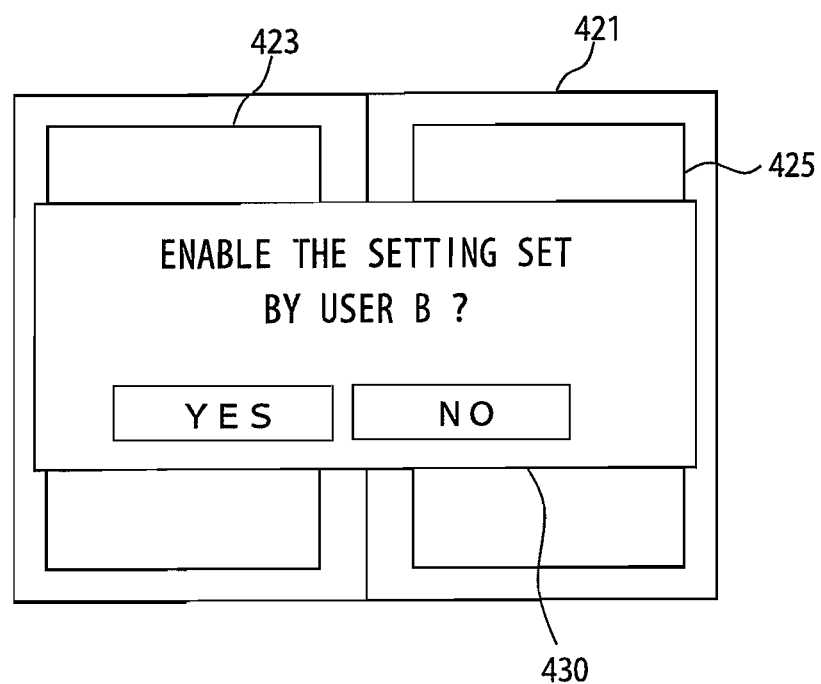
FIG. 11 shows an example of a confirmation screen.

FIG. 11 shows an example of a confirmation screen. The confirmation screen shown in FIG. 11 is displayed after the custom display screen shown in FIG. 10 is displayed on PC 300B operated by user C. Referring to FIG. 11, a confirmation screen 430 is displayed superimposed on custom display screen 421 shown in FIG. 10. Confirmation screen 430 includes a message "Enable the setting set by user B?", an approval button having "OK" displayed thereon, and a disapproval button having "NO" displayed thereon. When the approval button is designated by user C, the display is switched to the custom display screen that is generated on the basis of the output setting set by user B.

Figure 12:
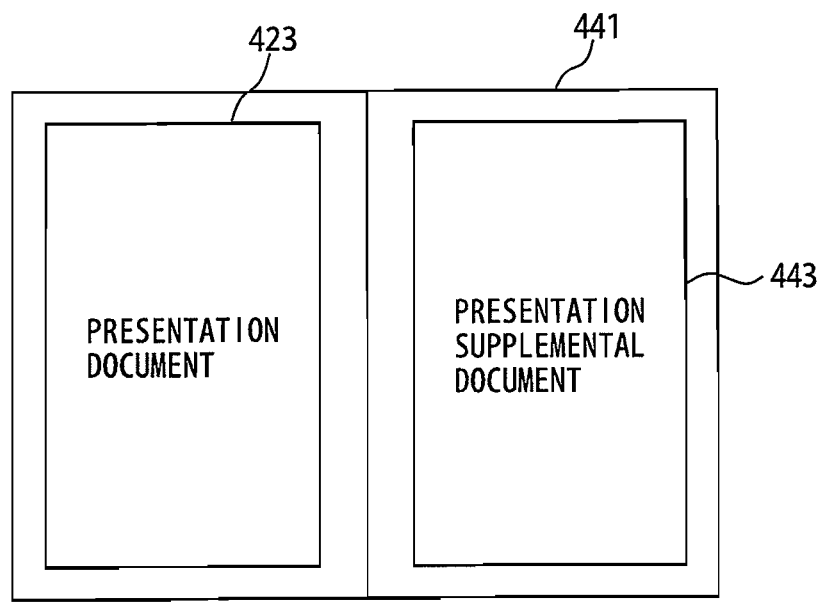
FIG. 12 shows yet another example of the custom display screen.

FIG. 12 shows yet another example of the custom display screen. The custom display screen 441 shown in FIG. 12 is displayed in the case where the approval button is designated in the confirmation screen shown in FIG. 11. This custom display screen 441 is a display screen generated on the basis of the output setting set by user B. Referring to FIG. 12, custom display screen 441 includes an area 423 and an area 443. In area 423, an image of object data 93 having the file name "presentation document" among object data 93 stored in advance in HDD 116 is displayed. In area 443, an image of object data 93 having the file name "presentation supplemental document" among object data 93 stored in advance in HDD 116 is displayed. While characters "presentation document" and "presentation supplemental document" are shown in the respective areas 423 and 443 in the drawing, actually, the images of object data 93 having the file names "presentation document" and "presentation supplemental document" are displayed in the respective areas.

Returning to FIG. 6, user specifying portion 69, when receiving audio data from speech accepting portion 61, performs speech recognition on the basis of the audio data so as to specify the user who uttered the speech. Voiceprint data for all the participants are stored in advance in HDD 116, and the audio data of the speech is compared with the voiceprint data to thereby specify the user. User specifying portion 69 outputs the user identification information of the specified user to counting portion 73.

Word extracting portion 71 extracts a word from a character string input from speech recognition portion 63, and outputs the extracted word to counting portion 73. The word may be predetermined. Counting portion 73 stores a set of the user identification information input from user specifying portion 69 and the word input from word extracting portion 71 in a keyword table 97 stored in HDD 116. The keyword table associates a word with each piece of user identification information. In the case where the word input from word extracting portion 71 is not stored in keyword table 97 in association with the user identification information input from user specifying portion 69, counting portion 73 additionally stores the word, whereas if the word input from word extracting portion 71 has been stored in keyword table 97, it does not store that word.

Further, counting portion 73 counts the number of times of input of the same word from word extracting portion 71 with respect to the user identification information input from user specifying portion 69. Specifically, counting portion 73 stores in HDD 116 accumulation data 99 that includes a counter for each user identification information and for each word, and when a word is input from word extracting portion 71, counting portion 73 increments by one the counter that corresponds to the user identification information input from user specifying portion 69 and the word input from word extracting portion 71.

Furthermore, counting portion 73 stores an accumulation condition table 98 in HDD 116 in advance, which defines a detection condition for each user. When there is a word for which the counter value in accumulation data 99 exceeds the detection condition, counting portion 73 outputs the word as tendency data, together with the user identification information, to an adding portion 77 which will now be described.

Adding portion 77 is included in display screen generating portion 75. When receiving tendency data from counting portion 73, adding portion 77 adds a character string of the word that is the tendency data input from counting portion 73, to all the display screens to be output to transmission control portion 79. For example, during the time when user A is speaking, the speech uttered by user A is subjected to speech recognition, and words extracted from the resultant character string are counted. Then, in the case where a counter value for a certain word satisfies a predetermined detection condition, the word satisfying the detection condition is added to the display screens provided to the participants. The word repeatedly uttered by user A may have an important meaning. Displaying that word on the display screens on PCs 300 and 300A to 300D can facilitate understanding of the content of the user A's speech by the participants. Furthermore, in the case where a participant has failed to catch the user A's speech, the participant may be able to readily understand the content of the user A's speech by looking at the word being displayed on the display screen.

FIG. 13 shows an example of a keyword table. Referring to FIG. 13, the keyword table associates a word with each of user identification information. Here, the keyword table includes a keyword record having user identification information and a word. The keyword record includes the fields of "user identification information" and "keyword 1" through "keyword n" (where n is a positive integer). Specifically, with the user identification information "user A" of a presenter, the words "question", "user A", . . . , "end" are associated. With the user identification information "user B" of a participant who is in charge of fund management, the words "cost", "money", . . . , "contract" are associated.

FIG. 14 shows an example of accumulation data. Referring to FIG. 14, the accumulation data associates each word with a counter value for each piece of user identification information. Specifically, for the user identification information "user A", the words "user A", "question", and "beginning" are associated with the counter values "20", "10", and "2", respectively. For the user identification information "user B", the words "money", "cost", and "approval" are associated with the counter values "600", "600", and "40", respectively.

Figures 15, 16:
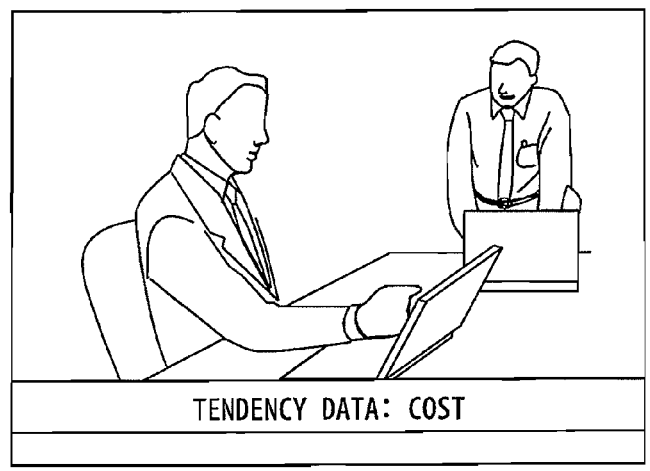
FIG. 15 shows an example of an accumulation condition table.
FIG. 16 shows an example of a display screen added with tendency data.

FIG. 15 shows an example of an accumulation condition table. Referring to FIG. 15, the accumulation condition table defines the number of conferences and a detection condition for each user. The number of conferences indicates how many conferences the user has attended. For example, the number of conferences is counted up every time the user logs in on MFP 100. The detection condition includes the number of times of detection and a detection criterion. The number of times of detection indicates a threshold value, and the detection criterion determines the way of calculating a value for detection from the counter value included in the accumulation data. Specifically, for the user identification information "user A", the number of conferences is set as "2", the number of times of detection is set as "5", and the detection criterion is set as "average number of times". Thus, any word whose average number of times of utterance per conference is five or more satisfies the detection condition. With the number of conferences being set as "2", any word having the counter value of 10 or more among the words associated with the user identification information "user A" in the accumulation data satisfies the detection condition. In the accumulation data shown in FIG. 14, the words "user A" and "question" satisfy the detection condition.

FIG. 16 shows an example of a display screen added with tendency data. FIG. 16 shows the case where tendency data is displayed on the display screen shown in FIG. 8 during the time when a user identified by the user identification information "user B" is speaking. The display screen shown in FIG. 16 includes the character string "tendency data: cost" in the lower part of the display screen shown in FIG. 8. This allows user A looking at the display screen to know that the content of the user B's speech is related to the cost.

Figure 17:
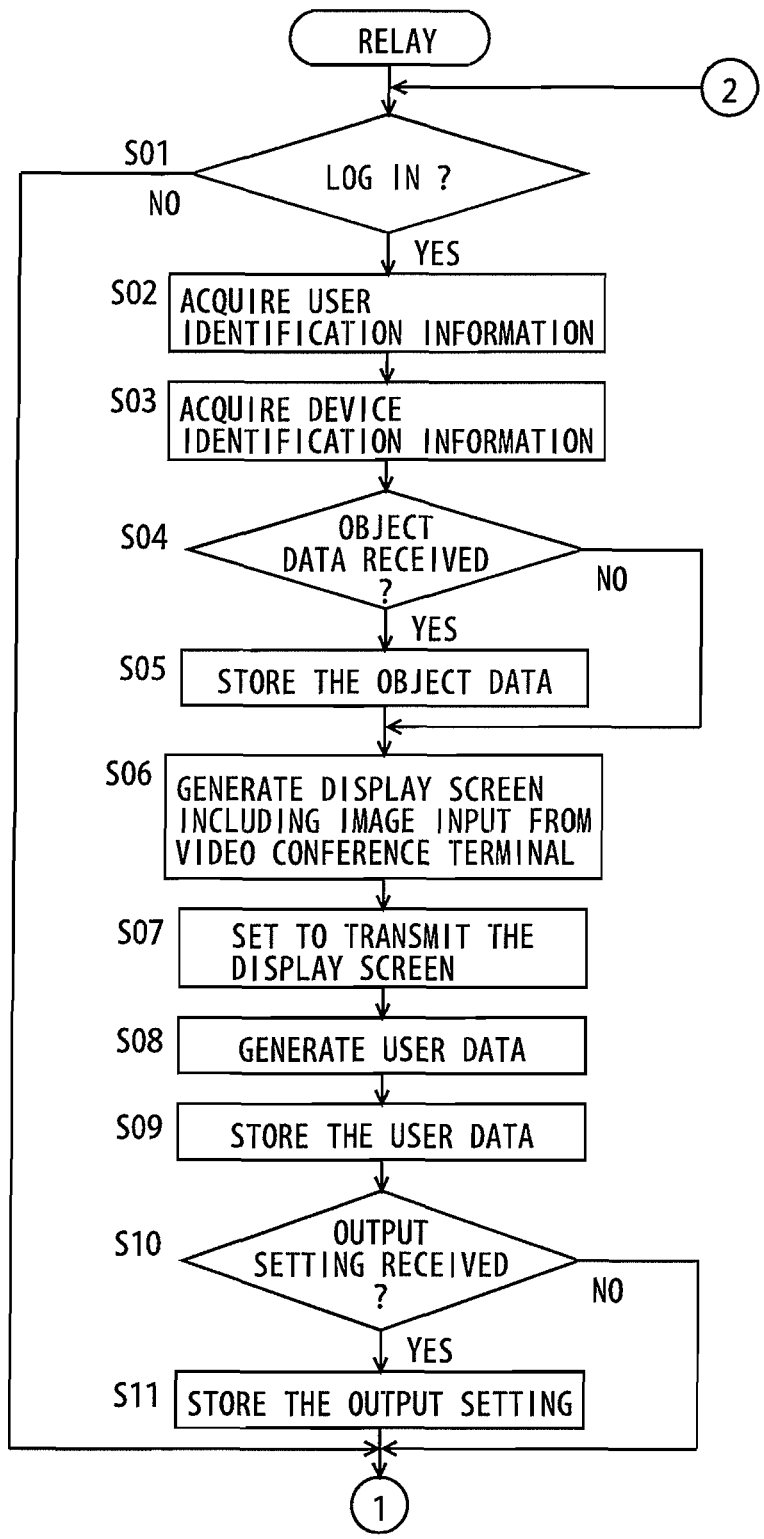
FIGS. 17 to 19 are first to third flowcharts illustrating an example of the flow of a relay process.

FIGS. 17 to 19 and FIG. 21 are flowcharts illustrating an example of the flow of a relay process. The relay process is performed by CPU 111 included in MFP 100 as CPU 111 executes an image transmitting program. Referring to FIG. 17, CPU 111 determines whether log in of a participant has been accepted (step S01). When communication I/F portion 112 receives user identification information from any of PCs 300 and 300A to 300D, log in is accepted. If the log in has been accepted, the process proceeds to step S02; otherwise, the process proceeds to step S12. In step S02, the user identification information received from communication I/F portion 112 is acquired. Then, device identification information for identifying the one of PCs 300 and 300A to 300D that has transmitted the user identification information is acquired (step S03).

In step S04, it is determined whether object data has been received. Specifically, it is determined whether communication I/F portion 112 has received object data from the one of PCs 300 and 300A to 300D specified by the device identification information acquired in step S03. If the object data has been received, the process proceeds to step S05; otherwise, the process proceeds to step S06, with step S05 being skipped. In step S05, the received object data is stored in HDD 116 in association with the user identification information received in step S02.

In step S06, a display screen is generated which includes an image input from one of video conference terminals 200, 200A, and 200B. The generated display screen is then transmitted to the one of PCs 300 and 300A to 300D that is specified by the device identification information acquired in step S03 (step S07).

In step S08, user data including the user identification information acquired in step S02 and the device identification information acquired in step S03 is generated, and the generated user data is stored in HDD 116 (step S09). Next, it is determined whether an output setting has been received (step S10). Specifically, it is determined whether communication I/F portion 112 has received an output setting from the one of PCs 300 and 300A to 300D that is specified by the device identification information acquired in step S03. If the output setting has been received, the process proceeds to step S11; otherwise, the process proceeds to step S12, with step S11 being skipped. In step S11, an output setting record associating the received output setting with the user identification information received in step S02 is generated and additionally stored in output setting table 91 stored in HDD 116. The process then proceeds to step S12.

Figure 18:
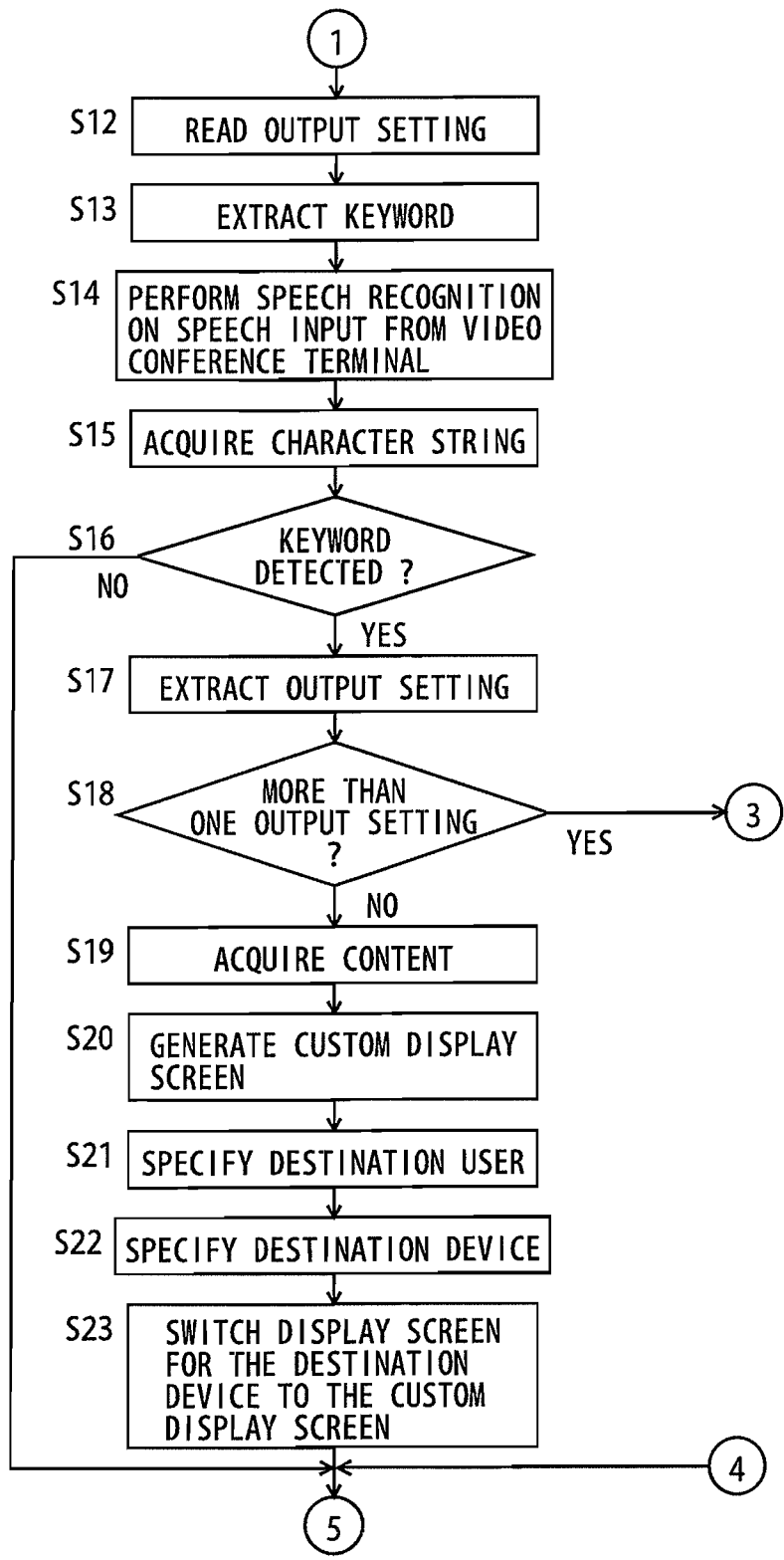

Referring to FIG. 18, in step S12, an output setting that is included in output setting table 91 stored in HDD 116 is read out. Then, a keyword set in the keyword field in the read output setting is extracted (step S13). The extracted keyword is temporarily stored in RAM 114.

A speech of audio data that is input from any of video conference terminals 200, 200A, and 200B is subjected to speech recognition (step S14), so that a character string is obtained (step S15). Next, the keyword extracted in step S13 is used to search the acquired character string, and it is determined whether the keyword has been detected from within the character string (step S16). In the case where two or more keywords have been extracted in step S13, each of the keywords is used for searching. If the keyword has been detected, the process proceeds to step S17; otherwise, the process proceeds to step S33.

In step S17, from the output settings read in step S12, any output setting including the keyword detected from within the character string in step S16 is extracted. It is then determined whether two or more output settings have been extracted (step S18). If two or more output settings have been extracted, the process proceeds to step S24; otherwise, the process proceeds to step S19.

In step S19, a content that is specified by the data identification information set in the content field of the extracted output setting is acquired. The content may include images input from video conference terminals 200, 200A, and 200B, and object data 93 stored in HDD 116 in step S05. Next, a custom display screen for displaying the acquired content is generated by the method that is set in the method field of the extracted output setting (step S20).

In the following step S21, a user to whom the custom display screen is to be transmitted is specified. Specifically, the user identification information that is set in the destination identification information field of the output setting extracted in step S17 is specified. Next, a destination device is specified (step S22). Specifically, a device corresponding to the device identification information that is associated with the user identification information specified in step S21 by user data 95 stored in HDD 116 is specified as the destination device. In the case where two or more pieces of user identification information are set in the destination identification information field of the output setting, a plurality of devices corresponding to the plurality of pieces of device identification information associated respectively with the plurality of pieces of user identification information are specified.

In the following step S23, the display screen to be transmitted to the destination device specified in step S22 is switched to the custom display screen generated in step S20, and the process proceeds to step S33.

Figure 19:
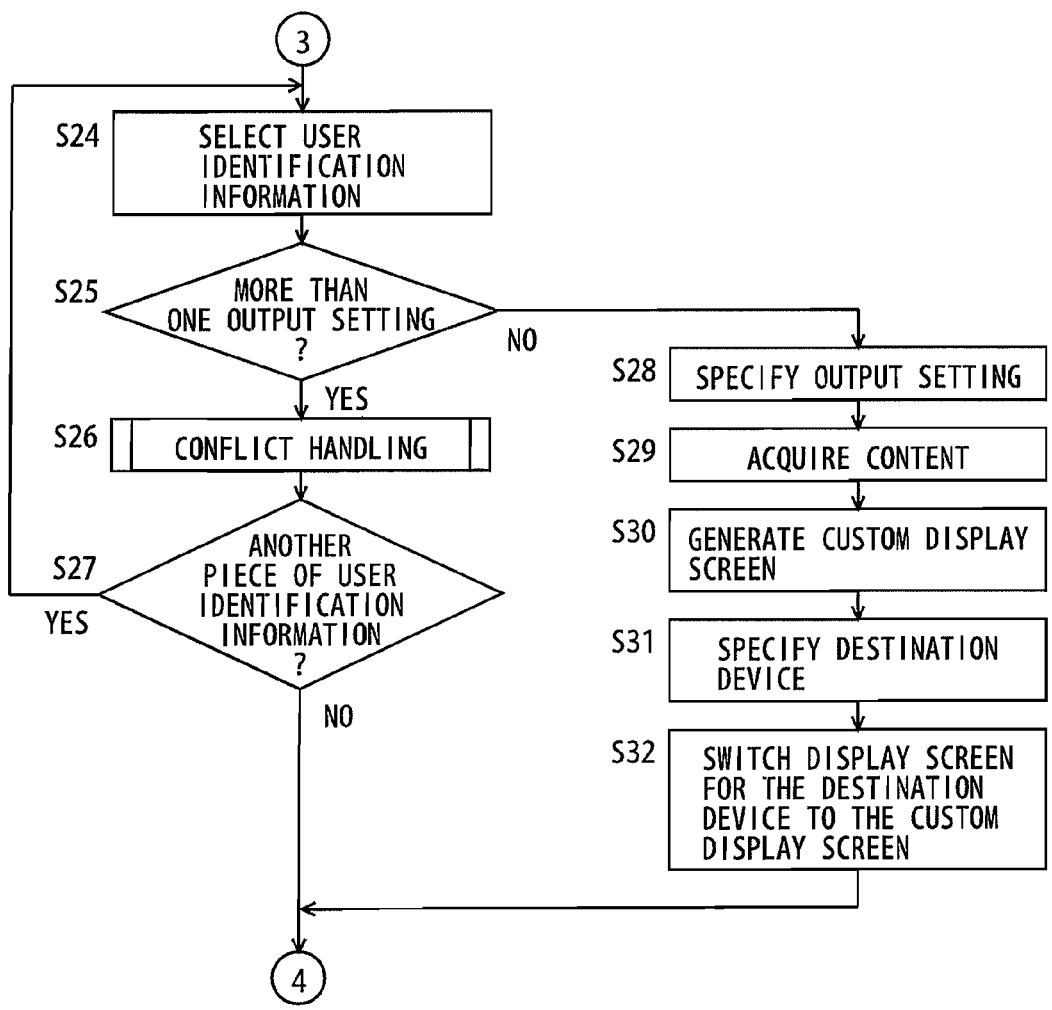

The process proceeds from step S18 to step S24 in the case where a plurality of output settings including the same keyword have been extracted in step S18. Referring to FIG. 19, in step S24, one of the plurality of pieces of user identification information that are set in the destination identification information fields in the plurality of output settings is selected as a process target.

It is then determined whether there are two or more output settings in which the user identification information selected as the process target is set in the destination identification information field (step S25). If there are two or more such output settings, the process proceeds to step S26; otherwise, the process proceeds to step S28.

In step S28, a single output setting in which the user identification information selected as the process target is set in the destination identification information field is specified. Then, a content that is specified by the data identification information set in the content field of the specified output setting is acquired (step S29). Next, a custom display screen for displaying the acquired content is generated by the method that is set in the method field of the specified output setting (step S30).

In the following step S31, a device to which the custom display screen is to be transmitted is specified. Specifically, the device corresponding to the device identification information that is associated with the user identification information selected as the process target in step S24 in user data 95 stored in HDD 116 is specified as the destination device. In the following step S32, the display screen to be transmitted to the destination device specified in step S31 is switched to the custom display screen generated in step S30, and the process proceeds to step S33.

On the other hand, in step S26, a conflict handling process is executed, and the process proceeds to step S27. The conflict handling process will be described below. In step S27, it is determined whether there is any other piece of user identification information yet to be selected as a process target. If there is user identification information not selected yet, the process returns to step S24; otherwise, the process proceeds to step S33.

Figure 20:
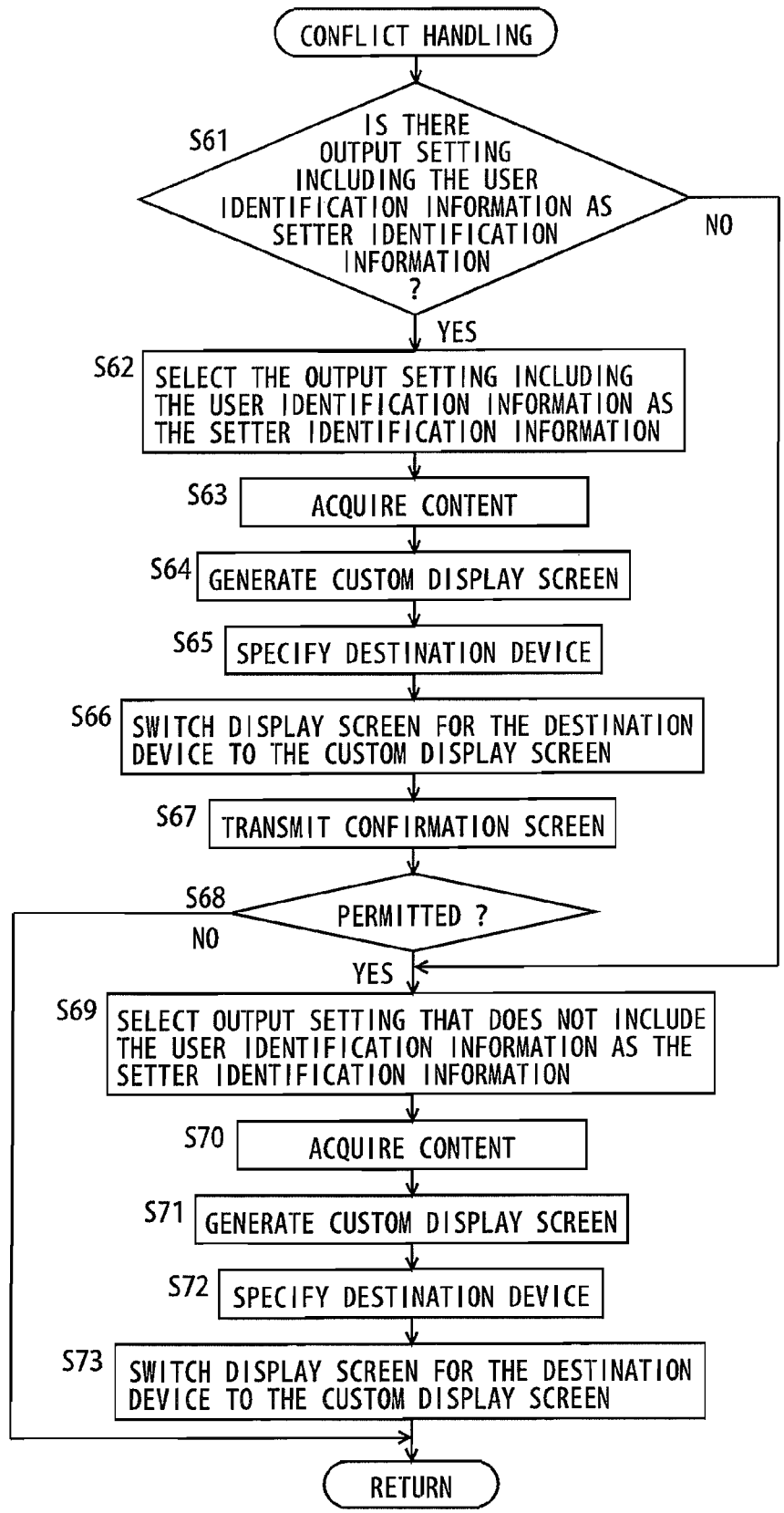
FIG. 20 is a flowchart illustrating an example of the flow of a conflict handling process.

FIG. 20 is a flowchart illustrating an example of the flow of the conflict handling process. The conflict handling process is carried out in step S26 in FIG. 19. The conflict handling process is executed in the state where a plurality of output settings have been extracted, the user identification information has been selected as a process target in step S24 in FIG. 19, and there are two or more output settings in which that user identification information is set in the destination identification information field.

Referring to FIG. 20, in step S61, it is determined whether the output settings that have been extracted include any output setting in which the user identification information being selected as the process target is set in the setter identification information field. The output setting that includes the user identification information selected as the process target in the setter identification information field is the output setting that has been set by the user identified by that user identification information. If such an output setting exists, the process proceeds to step S62; otherwise, the process proceeds to step S69. In step S62, the output setting in which the user identification information being selected as the process target is set in the setter identification information field is selected, and the process proceeds to step S63.

In step S63, a content that is specified by the data identification information set in the content field of the output setting selected in step S62 is acquired. Next, a custom display screen for displaying the acquired content is generated by the method that is set in the method field of the selected output setting (step S64).

In the following step S65, a device to which the custom display screen is to be transmitted is specified. Specifically, the device corresponding to the device identification information that is associated with the user identification information selected as the process target by user data 95 stored in HDD 116 is specified as the destination device. In the following step S66, the display screen to be transmitted to the destination device specified in step S65 is switched to the custom display screen generated in step S64, and the process proceeds to step S67.

In step S67, a confirmation screen is transmitted to the destination device specified in step S65, and the process proceeds to step S68. The confirmation screen is a screen for inquiring whether to switch the display to the display screen generated in accordance with the output setting set by another participant. The destination device that has received the confirmation screen displays the confirmation screen, and returns an enable signal when the participant permits switching of the screen, while it returns a disable signal when the participant does not permit switching thereof.

In step S68, it is determined whether switching of the display screen has been permitted by the participant who is operating the destination device. When the enable signal is received, it is determined that switching has been permitted, while when the disable signal is received, it is determined that switching has not been permitted. If switching has been permitted, the process proceeds to step S69; otherwise, the process returns to the relay process.

In step S69, the output setting that does not include the user identification information selected as the process target in the setter identification information field is selected, and the process proceeds to step S70. In the following step S70, a content that is specified by the data identification information set in the content field of the output setting selected in step S69 is acquired. Next, a custom display screen for displaying the acquired content is generated by the method that is set in the method field of the selected output setting (step S71).

In the following step S72, a device to which the custom display screen is to be transmitted is specified. Specifically, the device corresponding to the device identification information that is associated with the user identification information selected as the process target by user data 95 stored in HDD 116 is specified as the destination device. In the following step S73, the display screen to be transmitted to the destination device specified in step S72 is switched to the custom display screen generated in step S71, and the process returns to the relay process.

Figure 21:
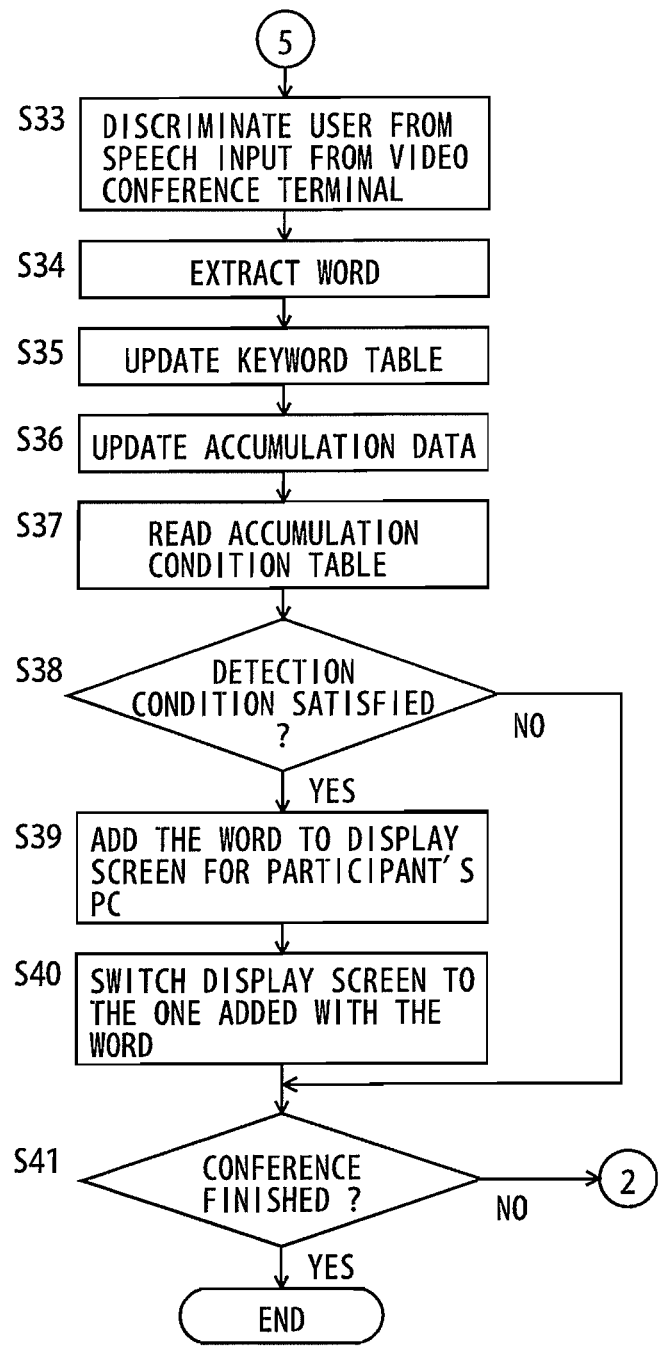
FIG. 21 is a fourth flowchart illustrating the example of the flow of the relay process.

Referring to FIG. 21, in step S33, on the basis of the audio data input from any of video conference terminals 200, 200A, and 200B, the user who is speaking is discriminated. Then, the speech of the audio data is subjected to speech recognition, so as to extract a word from a character string obtained as a result of the speech recognition (step S34). Then, the user identification information of the user discriminated in step S33 and the word extracted in step S34 are used to update keyword table 97 stored in HDD 116 (step S35), and also update accumulation data 99 in HDD 116 (step S36).

Next, accumulation condition table 98 stored in HDD 116 is read out (step S37), and it is determined whether the word extracted from the speech in step S34 satisfies the detection condition included in accumulation condition table 98 (step S38). If the word satisfies the detection condition, the process proceeds to step S39; otherwise, the process proceeds to step S41.

In step S39, the word is added to all the display screens for the PCs operated by the participants who logged in in step S01. Here, the display screens include the custom display screens. The display screen to be transmitted to a participant is switched to the display screen added with the word (step S40), and the process proceeds to step S41. It is noted that the word may be added to only the display screen for the PC that is operated by the user discriminated in step S33. In this case, the display screen added with the word is transmitted to only the PC operated by the user discriminated in step S33.

In step S41, it is determined whether the conference has finished. If the conference has finished, the process is terminated; otherwise, the process returns to step S01. In the case where a signal indicating an end of the conference is received from any of video conference terminals 200, 200A, and 200B, it is determined that the conference has finished.

As described above, MFP 100 according to the present embodiment performs speech recognition on a speech uttered by a participant to a conference, and in response to the event that a keyword included in an output setting registered in advance by a participant to the conference has been speech-recognized, it generates a custom display screen in accordance with the output setting including that keyword, and transmits the custom display screen to the PC that is operated by the user specified by the destination identification information included in the output setting. This allows the screens displayed on the PCs operated respectively by a plurality of participants to be switched in accordance with the speeches uttered by the plurality of participants. As a result, the screen can automatically be switched to a suitable one in correspondence with the progress of the conference.

In the case where two or more output settings including the same keyword and the same destination identification information are extracted, the output setting in which the setter identification information and the destination identification information are identical to each other (i.e. the self-set record) is selected in preference to others, and the custom display screen generated in accordance with that output setting is transmitted. This ensures that the output setting set by the participant him/herself is selected in preference to the output setting set by another participant.

Furthermore, in the case where two or more output settings including the same keyword and the same destination identification information are extracted, a confirmation screen is transmitted to the user who is specified by the user identification information set in the destination identification information field, and a custom display screen that is generated in accordance with the output setting in which the user identification information set in the setter identification information field is different from the user identification information set in the destination identification information field (i.e. the other-set record) is transmitted on the condition that transmission thereof is permitted. This allows the custom display screen generated in accordance with the output setting set by another participant to be displayed.

The confirmation screen inquiring whether to display the custom display screen generated in accordance with the output setting set by another participant is transmitted, so that the intention of the participant can be confirmed.

Still further, MFP 100 specifies a user who has uttered a speech and extracts a word from a character string converted from the speech. Then, in response to the event that any one of the extracted words has been uttered at least at a frequency satisfying a detection condition, MFP 100 adds that word to the display screen. The word repeated frequently in the user's speech is displayed, which can provide information facilitating understanding of the content of the speech.

While MFP 100 as the image transmitting apparatus has been described in the above embodiment, it is of course possible to understand the present invention as an image transmitting method for carrying out the processes shown in FIGS. 17 to 21, or as an image transmitting program for causing a computer to execute the image transmitting method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image transmitting apparatus comprising:
   an accepting portion to accept a picked up image and a speech;
   a speech recognition portion to recognize said accepted speech;
   a screen generating portion, in response to an event that a keyword included in a predetermined output setting for displaying a display screen on a computer is recognized by said speech recognition portion, to generate a display screen in accordance with said output setting, the display screen including at least one of said picked up image and an image of object data that is stored in association with said keyword in advance independently from said picked up image; and
   a transmission control portion to transmit, in accordance with said output setting, said generated display screen to at least one of a plurality of computers operated respectively by a plurality of users, wherein
   said screen generating portion automatically switches the display screen including the image of object data that is stored in association with the recognized keyword in accordance with said output setting when a keyword included in said predetermined output setting is recognized by said speech recognition portion.

2. The image transmitting apparatus according to claim 1, wherein said output setting includes setter identification information for identifying one of said plurality of users who has set said output setting, and destination identification information for identifying at least one of said plurality of users to whom said display screen is to be transmitted,
   the image transmitting apparatus further comprising an extracting portion to extract, from among a plurality of said output settings, any output setting that includes a keyword identical to part of the character string obtained by said speech recognition portion, wherein
   in the case where a plurality of output settings including same destination identification information are extracted, said transmission control portion transmits said display screen that is generated in accordance with one of the output settings in which said setter identification information is identical to the destination identification information.

3. The image transmitting apparatus according to claim 2, wherein in the case where a plurality of output settings including same destination identification information are extracted, said transmission control portion transmits said display screen that is generated in accordance with one of the output settings in which said setter identification information is different from the destination identification information, on the condition that a user specified by said destination identification information permits transmission thereof.

4. The image transmitting apparatus according to claim 3, wherein said transmission control portion includes a confirmation portion which transmits a confirmation screen to a computer operated by the user specified by said destination identification information for inquiring whether to display said display screen generated in accordance with the output setting in which said setter identification information is different from the destination identification information.

5. The image transmitting apparatus according to claim 1, further comprising:
   a user specifying portion to specify one of said plurality of users who has uttered said accepted speech;
   an extracting portion to extract a word from a character string converted from the speech by said speech recognition portion; and
   a counting portion to count said extracted word for each of said specified users; wherein
   said screen generating portion includes an adding portion which, in the case where the number of times of utterance of any one of said extracted words is equal to or greater than a predetermined frequency, adds the word to the display screen transmitted to the at least one of the plurality of computers operated respectively by the plurality of users.

6. An image transmitting method comprising the steps of:
   accepting a picked up image and a speech;
   recognizing said accepted speech;
   generating, in response to an event that a keyword included in a predetermined output setting for displaying a display screen on a computer is recognized in said recognizing step, a display screen in accordance with said output setting, the display screen including at least one of said picked up image and an image of object data that is stored in association with said keyword in advance independently from said picked up image; and
   transmitting, in accordance with said output setting, said generated display screen to at least one of a plurality of computers operated respectively by a plurality of users, wherein
   said generating step automatically switches the display screen including the image of object data that is stored in association with the recognized keyword in accordance with said output setting when a keyword included in said predetermined output setting is recognized in said recognizing step.

7. The image transmitting method according to claim 6, wherein said output setting includes setter identification information for identifying one of said plurality of users who has set said output setting, and destination identification information for identifying at least one of said plurality of users to whom said display screen is to be transmitted,
   the image transmitting method further comprising the step of extracting, from among a plurality of said output settings, any output setting that includes a keyword identical to part of the character string obtained in said recognizing step, wherein
   said transmitting step includes a first transmitting step of, in the case where a plurality of output settings including same destination identification information are extracted, transmitting said display screen that is generated in accordance with one of the output settings in which said setter identification information is identical to the destination identification information.

8. The image transmitting method according to claim 7, wherein said transmitting step includes a second transmitting step of in the case where a plurality of output settings including same destination identification information are extracted, transmitting said display screen that is generated in accordance with one of the output settings in which said setter identification information is different from the destination identification information, on the condition that a user specified by said destination identification information permits transmission thereof.

9. The image transmitting method according to claim 8, wherein said transmitting step includes a third transmitting step of transmitting a confirmation screen to a computer operated by the user specified by said destination identification information for inquiring whether to display said display screen generated in accordance with the output setting in which said setter identification information is different from the destination identification information.

10. The image transmitting method according to claim 6, further comprising the steps of:
specifying one of said plurality of users who has uttered said accepted speech;
extracting a word from a character string converted from the speech in said converting step; and
counting said extracted word for each of said specified users; wherein
said generating step includes the step of in the case where the number of times of utterance of any one of said extracted words is equal to or greater than a predetermined frequency, adding the word to the display screen transmitted to the at least one of the plurality of computers operated respectively by the plurality of users.

11. An image transmitting program embodied on a non-transitory computer readable medium, the program causing a computer to perform the steps of:
accepting a picked up image and a speech;
recognizing said accepted speech;
generating, in response to an event that a keyword included in a predetermined output setting for displaying a display screen on a computer is recognized in said recognizing step, a display screen in accordance with said output setting, the display screen including at least one of said picked up image and an image of object data that is stored in association with said keyword in advance independently from said picked up image; and
transmitting, in accordance with said output setting, said generated display screen to at least one of a plurality of computers operated respectively by a plurality of users, wherein
said generating step automatically switches the display screen including the image of object data that is stored in association with the recognized keyword in accordance with said output setting when a keyword included in said predetermined output setting is recognized in said recognizing step.

12. The image transmitting program embodied on the non-transitory computer readable medium according to claim 11, wherein said output setting includes setter identification information for identifying one of said plurality of users who has set said output setting, and destination identification information for identifying at least one of said plurality of users to whom said display screen is to be transmitted,
the image transmitting program causing said computer to further perform the step of extracting, from among a plurality of said output settings, any output setting that includes a keyword identical to part of the character string obtained in said recognizing step, wherein
said transmitting step includes a first transmitting step of, in the case where a plurality of output settings including same destination identification information are extracted, transmitting said display screen that is generated in accordance with one of the output settings in which said setter identification information is identical to the destination identification information.

13. The image transmitting program embodied on the non-transitory computer readable medium according to claim 12, wherein said transmitting step includes a second transmitting step of, in the case where a plurality of output settings including same destination identification information are extracted, transmitting said display screen that is generated in accordance with one of the output settings in which said setter identification information is different from the destination identification information, on the condition that a user specified by said destination identification information permits transmission thereof.

14. The image transmitting program embodied on the non-transitory computer readable medium according to claim 13, wherein said transmitting step includes a third transmitting step of transmitting a confirmation screen to a computer operated by the user specified by said destination identification information for inquiring whether to display said display screen generated in accordance with the output setting in which said setter identification information is different from the destination identification information.

15. The image transmitting program embodied on the non-transitory computer readable medium according to claim 11, causing said computer to further perform the steps of:
specifying one of said plurality of users who has uttered said accepted speech;
extracting a word from a character string converted from the speech in said converting step; and
counting said extracted word for each of said specified users; wherein
said generating step includes the step of, in the case where the number of times of utterance of any one of said extracted words is equal to or greater than a predetermined frequency, adding the word to the display screen transmitted to the at least one of the plurality of computers operated respectively by the plurality of users.

* * * * *